(12) United States Patent
Grant et al.

(10) Patent No.: US 10,284,286 B2
(45) Date of Patent: May 7, 2019

(54) MULTIUSER COMMUNICATIONS SYSTEM

(71) Applicant: University of South Australia, Adelaide, South Australia (AU)

(72) Inventors: Alexander James Grant, Adelaide (AU); Gottfried Lechner, Adelaide (AU); Andre Pollok, Adelaide (AU); Robert George McKilliam, Adelaide (AU); Ingmar Rudiger Land, Adelaide (AU); David Victor Lawrie Haley, Adelaide (AU); William George Cowley, Adelaide (AU); Linda Mary Davis, Adelaide (AU); Sorin Adrian Barbulescu, Adelaide (AU); John Lawrence Buetefuer, Adelaide (AU); Marc Pierre Denis Lavenant, Adelaide (AU)

(73) Assignee: Myriota Pty Ltd, Adelaide, South Australia (AU)

( * ) Notice: Subject to any disclaimer, the term of this patent is extended or adjusted under 35 U.S.C. 154(b) by 90 days.

(21) Appl. No.: 14/913,339

(22) PCT Filed: Aug. 21, 2014

(86) PCT No.: PCT/AU2014/000826
§ 371 (c)(1),
(2) Date: Feb. 19, 2016

(87) PCT Pub. No.: WO2015/024056
PCT Pub. Date: Feb. 26, 2015

(65) Prior Publication Data
US 2016/0204852 A1    Jul. 14, 2016

(30) Foreign Application Priority Data
Aug. 21, 2013   (AU) .............................. 2013903163

(51) Int. Cl.
H04B 7/185        (2006.01)
H04B 1/10         (2006.01)
(Continued)

(52) U.S. Cl.
CPC .... H04B 7/18539 (2013.01); H04W 72/0446 (2013.01); H04W 72/082 (2013.01); H04B 1/7107 (2013.01); H04W 88/02 (2013.01)

(58) Field of Classification Search
CPC ...... H04B 1/10; H04B 1/707; H04B 1/71075; H04B 7/18539; H04B 1/71072;
(Continued)

(56) References Cited

U.S. PATENT DOCUMENTS 6,137,843 A * 10/2000 Chennakeshu ........ H01Q 1/246
                                                   375/340
6,393,047 B1     5/2002 Popovic'
(Continued)

FOREIGN PATENT DOCUMENTS

EP        1 516 432 B1     2/2007
JP        2004364157 A     12/2004
(Continued)

OTHER PUBLICATIONS

Latva-Aho, M et al., "Residual interference suppression in parallel interference cancellation receivers", Communications, Jun. 6-10, 1999, ICC '99, 1999 IEEE International Conference on, vol. 2, pp. 927-931.
(Continued)

*Primary Examiner* — Ahmed Elallam
(74) *Attorney, Agent, or Firm* — McDonnell Boehnen Hulbert & Berghoff LLP

(57) ABSTRACT

A multiuser communication system comprises multiple transmitters and a multiuser receiver that detects multiple transmissions via iterative soft interference cancellation. An
(Continued)

initial acquisition module and single user decoder module are also described. The multiuser receiver acquires and subtracts known users in the residual signal before acquiring new users in the residual signal, which is performed iteratively until no new users are detected or a stopping criterion is met. To aid receiver acquisition, the transmitters insert discrete tones into the transmitted signals. These allow the multiuser receiver to obtain initial estimates of the frequency, time, gain, and/or phase offset for each user. To improve the quality of cancellation the receiver refines estimates of gain, time, frequency and phase offsets for each user after each iteration, and calculates time varying SINR estimates for each user. The multiuser receiver may be satellite based, may be a distributed receiver, or process users in parallel.

19 Claims, 10 Drawing Sheets

(51) Int. Cl.
*H04W 72/04* (2009.01)
*H04W 72/08* (2009.01)
*H04W 88/02* (2009.01)
*H04B 1/7107* (2011.01)

(58) Field of Classification Search
CPC ............ H04W 72/082; H04W 72/085; H04W 72/0446; H04W 88/02; H04J 11/004; H04J 11/0023; H04L 25/03305; H04L 25/067

See application file for complete search history.

(56) References Cited

U.S. PATENT DOCUMENTS

| | | | |
|---|---|---|---|
| 6,671,338 B1* | 12/2003 | Gamal | H04L 1/0048 375/144 |
| 7,099,378 B2 | 8/2006 | Dunyak et al. | |
| 7,486,726 B2 | 2/2009 | Alexander et al. | |
| 7,548,506 B2 | 6/2009 | Ma et al. | |
| 7,724,809 B2* | 5/2010 | Lee | H04B 1/71075 375/152 |
| 7,813,700 B2 | 10/2010 | Zheng et al. | |
| 7,920,651 B2* | 4/2011 | McElwain | H03M 13/2957 375/316 |
| 8,238,499 B2* | 8/2012 | Reial | H04L 25/03305 375/148 |
| 8,693,588 B2* | 4/2014 | McCloud | H04L 25/03242 375/341 |
| 8,908,743 B2* | 12/2014 | Badic | H04L 25/03891 375/144 |
| 9,083,419 B2* | 7/2015 | Alexander | H04J 11/0063 |
| 9,590,768 B2* | 3/2017 | White | H04L 1/1812 |
| 9,647,708 B2* | 5/2017 | Scharf | H04B 1/7105 |
| 2002/0110206 A1* | 8/2002 | Becker | H04L 1/0048 375/346 |
| 2004/0005010 A1 | 1/2004 | He et al. | |
| 2005/0174983 A1* | 8/2005 | Naguleswaran | H04B 1/10 370/347 |
| 2008/0019429 A1* | 1/2008 | Reznik | H04B 1/7103 375/148 |
| 2008/0317150 A1* | 12/2008 | Alexander | H04L 25/0204 375/260 |
| 2013/0201972 A1* | 8/2013 | Alexander | H04L 25/0204 370/336 |

FOREIGN PATENT DOCUMENTS

| | | |
|---|---|---|
| JP | 2013016967 A | 1/2013 |
| WO | 2003041292 A1 | 5/2003 |

OTHER PUBLICATIONS

Brunel, L. et al., "Interative interference cancellation scheme with pilot-aided space-time estimation in DS-CDMA systems", Vehicular Technology Conference, 2001, VTC 2001 Fall, IEEE VTS 54th, vol. 1, p. 197-201.

Wang, X. et al., "Interative (Turbo) Soft Interference Cancellation and Decoding for Coded CDMA", IEEE Transactions on Communications, vol. 47, No. 7, Jul. 1999, pp. 1046-1061.

Ijaz, A., et al., "Improved SNR estimation for BPSK and ZPSK signals", IET Electron. Lett., 45(16):858-859, 2009.

Jin, H. et al., "Irregular repeat-accumulate codes", in Proc. Int. Symp. on Turbo Codes & Rel. Topics, 2000, pp. 1-8.

Derder, M. et al., "Digital Filter and square timing recovery", IEEE Trans. Commun., 36(5):605-612, May 1988.

Ren, G. et al., "A new SNR's estimator for QPSK modulations in an AWGN channel", IEEE Trans. Circuits Syst. II, 52 (6):336-338, 2005.

Shin, Dong-Joon et al., "Simple SNR estimation methods for QPSK modulated short bursts", In Proc. IEEE Global Telecommun. Conf. (GLOBECOM), vol. 6, pp. 3644-3647, 2001.

Daisuke Ishibashi and Takeshi Hashimoto, "On Asynchronous Multiple-Access Using Turbo-Hadamard Codes," IEICE Tech. Rep., vol. 108, No. 455, CS2008-83, pp. 49-54, Mar. 2009. (English abstract only).

* cited by examiner

Figure 12G – MUD Iteration 11
Figure 12H – MUD Iteration 12
Figure 12I – MUD Iteration 13
Figure 12J – MUD Iteration 14
Figure 12K – MUD Iteration 15
Figure 12L – MUD Iteration 16

MULTIUSER COMMUNICATIONS SYSTEM

CROSS-REFERENCE TO RELATED APPLICATIONS

The present application is a U.S. National Phase Application pursuant to 35 U.S.C. § 371 of International Application No. PCT/AU2014/000826 filed Aug. 21, 2014, which claims priority to Australian Provisional Patent Application No. 2013903163 filed Aug. 21, 2013. The entire disclosure contents of these applications are herewith incorporated by reference into the present application.

INCORPORATION BY REFERENCE

The following co-pending patent applications are referred to in the following description:

PCT/AU2013/000895 titled "Channel Allocation In A Communication System" and filed on 14 Aug. 2013 claiming priority from Australian Provisional Patent Application No 2012903489;

PCT/AU2013/001079 titled "Multi-Access Communication System" and filed on 20 Sep. 2013 claiming priority from Australian Provisional Patent Application No 2012904145;

PCT/AU2013/001064 titled "Carrier Phase and Amplitude Estimation For Phase Shift Keying Using Pilots and Data" and filed on 13 Dec. 2013 claiming priority from Australian Provisional Patent Application No 2012905489;

PCT/AU2013/001501 titled "Digital Communication System" and filed on 20 Dec. 2013 claiming priority from Australian Provisional Patent Application No 2012905588; and PCT/AU2014/000139 titled "Synchronisation Using Pilots And Data" and filed on 19 Feb. 2014 claiming priority from Australian Provisional Patent Application No 2013900552.

The content of each of these applications is hereby incorporated by reference in their entirety.

PRIORITY DOCUMENTS

The present application claims priority from Australian Provisional Patent Application No 2013903163 titled "A Multiuser Communications System" and filed on 21 Aug. 2013, the content of which is hereby incorporated reference in its entirety.

TECHNICAL FIELD

The present invention relates to wireless communications. In a particular form, the present invention relates to a multiuser communications system.

BACKGROUND

In many communications systems, it is desirable for several remote terminals (transmitters) to communicate data over a shared communications medium to a central node (receiver). For example, the shared medium might be a portion of radio spectrum. FIG. 1 shows a generic setting where k transmitters 2 are communicating via a shared medium 3 with a common receiver 4.

One challenge in such scenarios is how to efficiently share the medium between the different transmitters. In situations where centralised control is possible, the transmitters can agree to access the channel using some orthogonal access scheme, such as time division multiple access or frequency division multiple access. Other methods include code division multiple access and orthogonal frequency division multiple access. Such schemes require very tight time and frequency synchronisation between all the transmitters in order to maintain orthogonality between the user's signals. This can be demanding, or expensive to achieve.

Furthermore, in many situations of interest, the communications medium may be dispersive in time or frequency (or both). One example of such a channel is the multipath mobile radio channel, where relative motion of transmitters and receivers can induce Doppler offsets. Reflections of radio signals from the environment also results in the superposition of many copies of the transmitted waveform, each with its own time delay, attenuation and phase offset. Another example of a channel which can introduce significant time and frequency offsets is in the context of communication with a low earth orbit satellite. In this situation, the time-of-flight to the satellite can vary significantly depending on the relative position of the satellite with respect to the transmitter. Furthermore, the high speed of the satellite (as seen from a fixed point on the ground) induces large Doppler offsets.

In such situations, the satellite channel can impose (potentially time-varying) time, frequency and phase offsets to each of the transmitted signals. In some situations the frequency offset may even be time-varying, according to some frequency rate (measured in radians/second$^2$ or Hz/second). These conditions can also occur in some terrestrial cases, such as when the receiver is an airborne receiver, or transmitters are fast moving relative to the receiver (eg the transmitters are airborne) in which case the communications channel will be referred to as a satellite-like channel.

These offsets may not be known a-priori to the transmitters, which means that attempts to transmit using orthogonal access schemes can be defeated by the channel. Although the transmitted signals are orthogonal, they may be non-orthogonal when they arrive at the receiver. This causes multiple-access interference, whereby the signals from different transmitters mutually interfere at the receiver. This can seriously degrade the performance of the system.

One approach to address this problem is to estimate the relevant time, frequency and phase offsets at the receiver and use a feedback channel to provide these estimates to the corresponding transmitters so that they can pre-compensate for these effects. This approach not only requires a dedicated feedback channel, it must operate fast enough such that the channel parameters do not change too much from when they were estimated to when they are used.

Another approach is to use guard bands and guard intervals to provide sufficient time and frequency separation so that no matter what offsets are introduced by the channel, the signals from different transmitters do not interfere. This approach is simple, but still requires sufficiently accurate synchronisation between the transmitters. Furthermore, it is wasteful of bandwidth, which may be a problem if a spectrally efficient system is required.

There is thus a need to provide an improved multiuser communications system that is adapted for use in cases where there are multiple transmitters transmitting to a receiver, wherein the multiple transmissions mutually interfere and are transmitted over a satellite or satellite-like channel to the multiuser receiver, or to at least provide a useful alternative to existing systems.

SUMMARY

According to a first aspect, there is provided a method for operation of a multiuser receiver in a slot based wireless communication system to detect multiple transmissions via iterative soft interference cancellation, the method comprising:

a) obtaining an initial residual signal by receiving a signal in a slot;

b) attempting to acquire one or more users in the residual signal, and for each new user acquired, estimating a set of channel parameters for the user, and adding the new user to a set of acquired users;

c) decoding the residual signal, for each user in the set of acquired users, using the current channel parameters for the user to generate a soft estimate of the signal contribution from the user and updated channel parameters for the user;

d) updating the residual signal by subtracting the soft estimate of the signal contribution for each user from the residual signal; and e) performing another iteration of steps b) to d) until a termination condition is met.

According to a second aspect, there is provided a method for transmission to as multiuser receiver in a slot based wireless communication system, the method comprising:

a) selecting a slot for transmission;

b) generating a complex baseband signal for transmission of a data block;

c) adding a predefined signal to aid acquisition to the complex baseband signal;

d) generating a transmission signal from the complex baseband signal; and e) transmitting the transmission signal in the selected slot.

In a further form, a multiuser decoder is provided that is configured to implement the method of the first aspect. Similarly in a further form a transmitter is provided that is configured to implement the method of the second aspect. A multiuser communications system may also be provided that comprises the multiuser decoder and a plurality of the transmitters.

According to a third aspect, there is provided an initial acquisition module for use in a multiuser decoder configured to acquire one or more users in a residual signal, the initial acquisition module comprising:

an input for receiving an oversampled residual signal;

a compensator performing an initial compensation for the Doppler rate;

a coarse frequency offset estimator for estimating an initial coarse frequency offset using a predefined signal inserted in a transmitted signal by a user to aid acquisition and configured to remove the estimated coarse frequency offset from the residual signal;

a time offset estimator for estimating the temporal offset with respect to the nominal slot boundary;

a pulse matched filter for filtering using the estimated time offset from the time offset estimator to generate a symbol rate signal;

an estimator module for estimating the complex signal gain, a fine frequency offset and frequency rate of change from the symbol rate signal, wherein the final estimate of the frequency offset is obtained as the sum of the initial coarse frequency offset and the fine frequency estimate and the final estimate of the frequency rate of change is obtained as the sum of the initial coarse frequency rate of change and the fine frequency rate of change estimate; and an acquisition signal removal module for either removing or cancelling the predefined signal inserted into a transmitted signal by a user to aid acquisition.

According to a fourth aspect, there is provided a single user decoder for use in a multiuser decoder configured to acquire one or more users in a residual signal, the single user decoder comprising:

an input for receiving an oversampled residual signal;

a channel removal module for removing channel effects using a previous estimate of the channel parameters;

a pulse matched filter for filtering the signal to generate a symbol rate signal;

an acquisition signal removal module for either removing or cancelling the predefined signal inserted into a transmitted signal by a user to aid acquisition;

a signal to interference plus noise (SINR) ratio estimator;

a decoder for soft decoding the signal to generate a decoder quality metric, a data hard decision data soft decision;

a soft remodulator for soft remodulating the data soft decision and generating a soft symbol estimate for the user, and soft estimates of the complex transmit signal;

an acquisition signal adder module for adding a predefined signal to aid acquisition to the complex transmit signal;

a channel estimator for obtaining updated channel parameters; and a channel application module for applying the estimate of the channel effects to the complex transmit signal to generate a soft estimate of the signal contribution from the user.

BRIEF DESCRIPTION OF DRAWINGS

Embodiments of the present invention will be discussed with reference to the accompanying drawings wherein:

FIGS. 12A to 12L are an iterative series of plots of a spectrum of a residual signal during the iterative multiuser decoder process illustrating iterations 3, 4, and 7-16, according to an embodiment.

DESCRIPTION OF EMBODIMENTS

Figure 1:
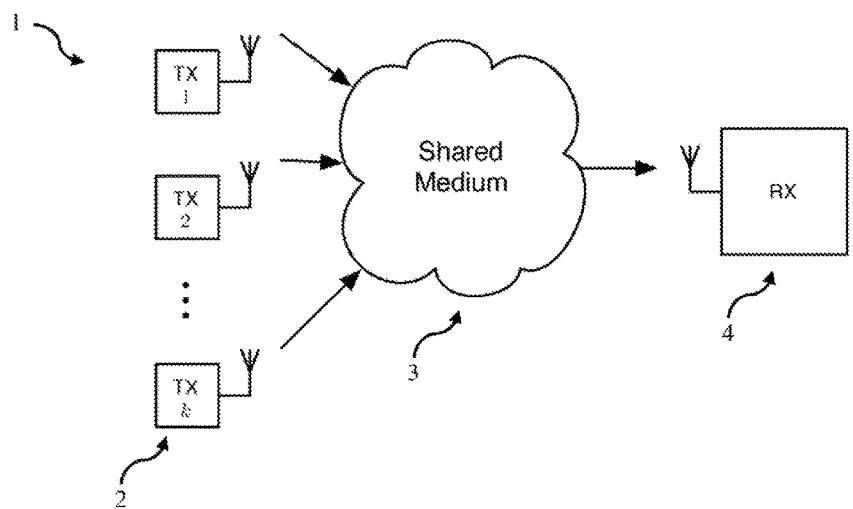
FIG. 1 is a schematic diagram of a multiple access communications system according to an embodiment.

Embodiments of the invention are described which addresses the above mentioned problems through use of a carefully designed transmitter waveform and a multiuser receiver which employs iterative soft interference cancellation to ameliorate the effects of multiple-access interference, while supporting relatively uncoordinated channel access by the transmitters.

Embodiments and components of the multiuser communications system described herein are particularly suited to systems where there am multiple transmitters transmitting to a multiuser receiver, and these multiple transmissions are uncoordinated in time and frequency, or relate to a satellite or satellite like channel. In particular, the system is adapted for use in cases where the multiuser receiver is located on a satellite and the multiple transmissions are over a satellite channel with significant frequency shifts, frequency rate of change or time delays compared to a terrestrial channel, or for cases where the multiuser receiver is a terrestrial receiver and the transmitters transmitting the multiple transmissions are subject to random effects such that the signals received at the multiuser receiver have transmission characteristics similar to transmissions over a satellite channel. Further, the embodiments are adapted for cases in which the multiple transmissions are each short sequences, which presents further challenges rapid acquisition and decoding.

The general concept of iterative soft interference cancellation for multiuser communications comprises decoding each transmitter's signal using a soft-in soft-out decoder, and than subsequently subtracting as soft estimate of each transmitter's signal from the received signal. This cancelled signal is than used as the input for the next round of soft decoding. In practice, particularly in the case of a satellite based multiuser receiver, there are several challenges with this approach as follows.

Accurate estimates of each use's channel parameters (eg time offset, frequency offset, phase offset) are required for decoding. These must (at least initially) be obtained in the presence of high levels of multiple access interference.

Accurate estimates of the residual signal-to-interference-plus-noise ratio (SINR) are required for proper operation of each user's soft decoder. This SINR corresponds to the level of the residual (as yet uncancelled, or even miscancelled) interference as seen by the user of interest. This SINR may even vary with time, as the signal from a particular user of interest may overlap in time with different interferers due to their relative time offsets.

Highly accurate estimates of each user's channel parameters are also required for the process of soft interference cancellation. This is due to the fact that the cancellation has to take into account the effect of the channel when subtracting a signal estimate from the received signal. This cancellation process must re-introduce these channel effects prior to subtraction. Inaccurate estimates of frequency, phase, time or gain could result in this process adding interference rather than cancelling it.

Embodiments of a multiuser receiver discussed below address these problems and provide the following advantages. First, implementation can be in a distributed manner. This allows for a low-complexity remote front end (eg on board a satellite) which forwards received samples to a more capable processing unit (eg located at a satellite ground station). Second, the implementation is highly parallelisable as the main processing task for each transmitter's signal can be performed in parallel. Third, the receiver exploits special structure (a predefined signal for coarse acquisition) introduced into the transmitted signals to facilitate the receiver in obtain initial (coarse) estimates of gain and time, frequency and phase offsets, even in the presence of multiple access interference. These estimates are obtained using low complexity algorithms. Fourth, the receiver computes accurate, time-varying SINR estimates for each user. Following the soft decoding for each user, the receiver refines its estimates of gain and time, frequency and phase offsets. This greatly improves the quality of the cancellation process and delivers better convergence properties compared to previous approaches.

Several embodiments will be discussed below. To assist in understanding the invention(s), a specific embodiment will be described in which many ground terminals wish to communicate data to a payload aboard a low earth orbit satellite, using relatively narrow channels (eg 20 kHz) in the VHF or UHF band. An implementation example is also described below. However, it is to be understood that the system could also be used in other scenarios where the communications channel from the transmitter to the receiver is satellite like (ie there are significant frequency shifts, frequency rate of change or time delays) or in cases where there are multiple interfering transmissions that are uncoordinated in time and frequency.

The transmitter architecture will first be discussed. As shown in FIG. 1, the system 1 consists of a plurality of transmitters 2 which communicate over a shared medium (the channel) 3, to a common multiuser receiver 4. In this embodiment channel access is slotted. Each transmitter has a sufficiently accurate time reference to enable slotted transmission. This reference could be provided for example by a free-running clock, or via a global positioning system (GPS) receiver. However, more generally it is to be understood that slots are understood in the widest possible sense, as discussed in PCT/AU2013/, ie these slots may be time slots, frequency slots or any other more general channelisation such as obtained through the use of spreading sequences.

In this example, embodiment the slots are time slots. Time slots are generally preferable in implementations where there are a large number of transmitters in the system. Each transmitter selects a slot for transmission. Slot selection may be performed randomly, as needed, or according to a predefined schedule, or based on geographic position as described in PCT/AU2013/000895. In one embodiment, the slots are time slots that are 250 ms long.

In one embodiment, time slots are grouped into frames where the length of a frame is equal to the transmit repeat interval. The frame number is a globally determinable count of the number of frame periods that have elapsed since epoch. Scheduling is performed by allocating one transmission per terminal, per frame, choosing the slot within the frame. The selection of the slot may be made by the terminal using a pseudo-random sequence. The terminal identifier and frame number may be used to seed the sequence. The sequence may have range greater than the number of slots per frame. In this case the slot may be selected as the sequence output modulo the frame length in slots.

We do not require that the transmitters have the ability to receive signals from the common receiver. However, system performance may be improved if such a feedback channel is available, using any of the methods described in PCT/AU2013/001079. Transmitters may also be instructed on new scheduling parameters, such as a new frame length.

Figure 2:
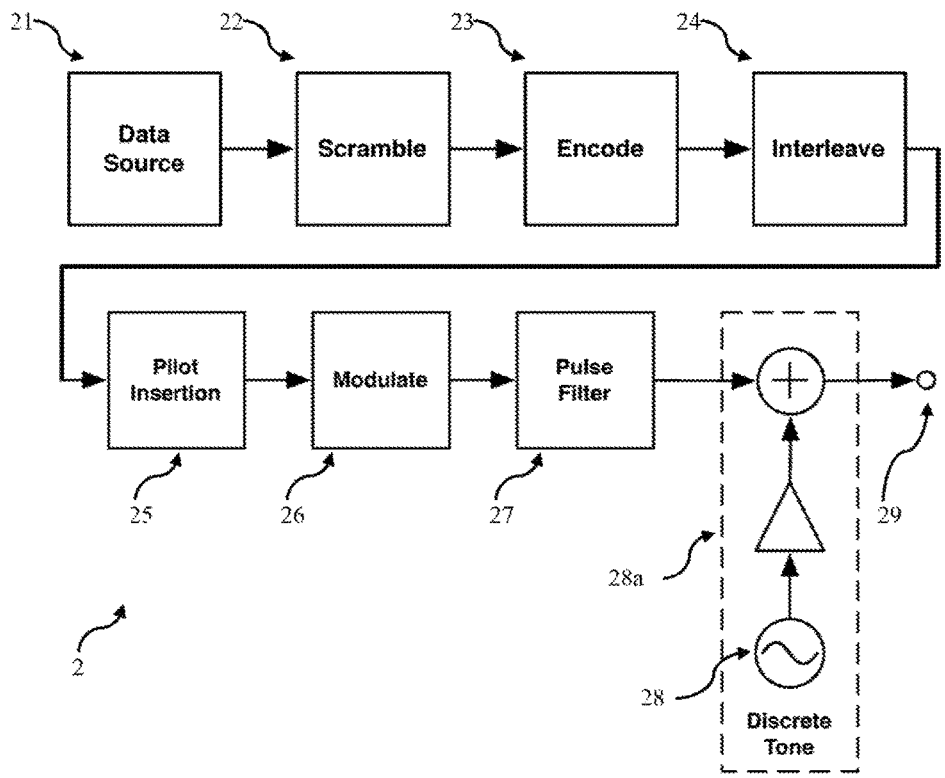
FIG. 2 is a block diagram of a baseband transmitter according to an embodiment.

The baseband signal to be transmitted in the chosen slot is generated according to the schematic block diagram in FIG. 2. We omit details of slot selection (examples of which can be found in PCT/AU2013/000895) and the optional feedback channel and associated processing (which can be found in PCT/AU2013/001079).

With reference to FIG. 2, binary data from a data source 21 is first scrambled 22 and then input to an error control encoder 23. The encoded data is then interleaved 24 after which pilot data 25 is then inserted. The resulting signal is then modulated 26 and a series of samples for transmission are generated using a pulse filter 27. Prior to transmission, acquisition signal adder module 28a is used to add a predefined signal 28 to aid acquisition to the signal. In this embodiment, the predefined signal is a discrete tone having a sinusoidal form (and the term discrete tone will be used as a shorthand reference to the predefined signal to aid acquisition to the signal). The resulting complex baseband signal 29 is then provided for transmission using standard transmission components which are not shown eg digital-to-analog conversion, filtering and modulation onto the selected carrier. As would be understood by the person skilled in the art, the various components can be omitted or varied depending upon the implementation details (eg frequency, bandwidth) and expected channel conditions (eg fading, interference).

The data source module 21 produces blocks of digital data for transmission. Framing and segmentation of data can also be performed in the data source but is outside the scope of this document. In one embodiment, the data is a sequence of 232 binary digits (bits).

The scrambler 22 is a rate-1 code which is used to remove any structure that might be present in the original source data (eg long runs of zeros or ones). As would be known by the person skilled in the art scrambling is standard practice in digital communications to assist with timing recovery and to decouple the spectral properties of the signal from the actual data. In one embodiment, the scrambler is additive, whereby the data sequence is added modulo-2 with the output of a linear feedback shift register with polynomial $x^7+x^4+1$.

An error control encoder 23 is used to introduce redundancy to provide protection against noise during transmission. The error control code assists the process of multiuser decoding, allowing the receiver to partially (soft) decode a user's signal in the presence of residual multiple access interference from other users. In one embodiment, the error control code is a rate ½ systematic irregular repeat accumulate code, where the degree sequence of the code is chosen using standard EXIT chart methods to facilitate convergence of the multiuser receiver. The encoder may also insert one or more known bits into the data sequence prior to encoding (also called doping). This can assist the early iterations of the multiuser decoding. In another one embodiment, the error control code is a low density generator matrix code. In this case, the optional interleaver may be omitted and the modulation may be selected as a recursive modulation, according to any of the methods described in PCT/AU2013/001501. In an embodiment where the input data was length 232, a rate ½ encoder would produce an encoded sequence of 464 bits.

The interleaver 24 is optional and is used to interleave or re-order (permute) the output of the encoder. This permutation is known to the receiver, and may be either the same, or different for each user.

The pilot insertion module 25 inserts pilot data into the data sequence to facilitate initial acquisition at the receiver. This pilot data is known to the receiver and may be the same, or different for each user. In one embodiment, pilot data may be distributed throughout the data sequence. In one embodiment, the pilot data is a continuous block of bits, prepended to the encoded (and interleaved) data sequence. In one embodiment, the pilot data is 28 bits long and consists of the following sequence: "0011001100001101100110010110". In an embodiment where the encoded data is 464 bits, this results in an output sequence of 492 bits.

The modulator 26 maps bits, or groups of bits onto a signalling constellation, which is a finite set of complex numbers, to produce symbols. The modulator can use a range of modulation such as those based upon quadrature amplitude modulation (QAM) or phase shift keying (PSK) as would be known to the person skilled in the art. In one embodiment, the modulator is a Gray-mapped quaternary phase shift keyed modulator.

The pulse filter 27 is used to shape the waveform for each symbol in order to obtain suitable spectral properties. In one embodiment, the pulse filter is a root-raised-cosine filter with roll-off $\beta=0.5$. In one embodiment, the root-raised-cosine filter is implemented using a finite duration impulse response with length L=7 symbols.

The acquisition signal adder module 28 is used to add a predefined signal to aid acquisition by the receiver. The performance of the multiuser receiver will often depend upon the rate that the receiver is able to obtain initial estimates of the frequency and time offset for each user. As will be discussed below once a coarse estimate is obtained, the receiver can generally quickly refine the coarse estimates to identify the signal contribution from the user. Thus, in the case where there are multiple interfering transmissions of various power, the faster a user can initially be identified, then the faster the signal contribution can be estimated and subtracted from the overall signal to allow a search for additional users to be performed. Thus, the faster the receiver can obtain coarse estimates then the greater the performance of the system will be in terms of throughput and processing efficiency (and thus power). In the context of a low earth orbit satellite system, the frequency offset may be relatively large. In order to facilitate initial estimation of this frequency offset, a predefined signal to aid acquisition is added to the modulated signal. In one embodiment this predefined signal 28 is a discrete tone such as a sinusoidal signal. In one embodiment, the phase of the tone is locked to the phase of the modulated signal. In one embodiment, the discrete tone is at 0 Hz of the baseband signal. In another one embodiment where the modulated signal has bandwidth 1 kHz, the tone has frequency 640 Hz relative to the centre of the baseband signal and is attenuated −7 dB with respect to the data signal. This frequency is chosen to lie in the roll-off portion of the signal spectrum.

Alternatively, the predefined signal to aid acquisition may be a different sequence known to the transmitter and receiver such as a particular spread-spectrum sequence, for example an m-sequence. Optionally, the predefined signal to aid acquisition may be different for each user (eg a different sinusoid, or different m-sequence) or different for different groups of users (such as based upon geographic location). In some embodiments, the predefined signal to aid acquisition does not overlap with the data carrying signal and instead, the predefined signal to aid acquisition is added before and/or after the data carrying signal, such as the start and/or end of a slot or in a separate slot. In the context of the specification, the term discrete tone will be used, although it is to be understood that a discrete tone can be replaced with another predefined signal to aid acquisition 28.

Signals from terminals in close geographic vicinity may experience similar channel conditions such as propagation delay, frequency offset, frequency rate of change and signal attenuation. To counteract strong mutual interference at the receiver, terminals may apply offsets to the transmit signal, e.g, time, frequency, frequency rate of change and/or transmit power.

In one embodiment, these offsets are chosen based upon the position of the transmitter in the field of view of the receiver as described in PCT/AU2013/000895. In one embodiment, these offsets are chosen randomly within a specified range. In one embodiment, the introduced offsets are quantised to a finite number of values within a specified range. In one embodiment, a random frequency offset within a specific range is applied. For example, the frequency offsets could be quantised into large steps with sizes considerably greater than the expected offset due to a channel effect to allow rapid estimation of the frequency offset due to the channel. For example, the frequency offsets could be 500 Hz steps. If a receiver estimates a frequency offset of 520 Hz, the receiver can partition the frequency offset based into an offset due to the known quantisation step of 500 Hz and a channel offset of 20 Hz.

A multiuser decoder 30 is used in the multiuser receiver 3 and operates on the principle of soft interference cancellation. Embodiments of the multiuser decoder described herein use several innovative aspects in order to address the problems described above.

Figure 3:
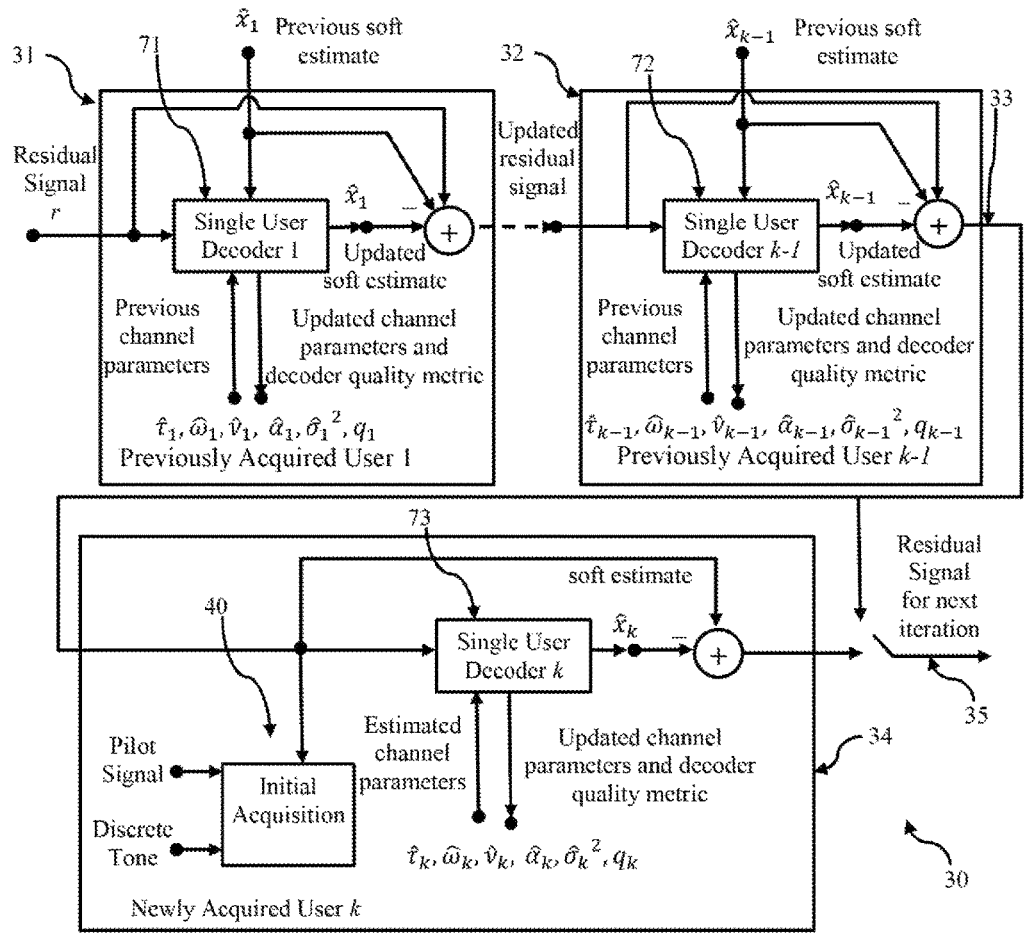
FIG. 3 is a block diagram of a multiuser receiver that performs serial processing according to an embodiment.

FIG. 3 shows a schematic representation of an embodiment of a receiver with a multiuser decoder 30, illustrating the signal flow between the various processing modules. The initial acquisition component 40 is shown in more detail in FIG. 7, while the operation of the single user decoder module 70 is elaborated in FIG. 8. The receiver operates on a slot-by-slot basis. Slotted operation allows each slot to be decoded independently of other slots, and facilitates a parallel implementation in which multiple instances of the multiuser decoder are run on different slots.

We describe the operation of the receiver for a particular slot. The receiver operates iteratively. In each iteration, the receiver starts with the residual signal r of the previous iteration and processes the previously acquired users in a serial manner. Initially, the set of previously acquired users is empty (with k=0 members) and the residual signal is the received signal.

For each previously acquired user, the single user decoder 70 is executed and an updated residual signal is formed. Each single user decoder uses it's residual signal, its previous soft estimate and the current estimates of the channel parameters (initially, these are the estimates provided by the initial acquisition module 40) to produce an updated soft estimate of its signal contribution $\hat{x}_k$. It also updates it's estimates of its channel parameters. For example, the first user is processed 31 using a first instance of a single user decoder module 71 to obtain a first updated residual signal, which is provided as input to the next single user decoder module and the process is repeated. Eventually the k-1$^{th}$ user is processed 32 using the k-1$^{th}$ instance of single user decoder module 72 to generate the residual signal 33.

After processing the set of previously acquired k-1 users, the receiver attempts to acquire a new user k using an instance of an initial acquisition module 41 on the residual signal output from the k-1$^{th}$ instance of single user decoder module 72 in block 34. That is, the initial acquisition is performed on the residual signal after removal of the best estimate of the signal contribution for all of the k-1 currently known users (transmitters). For each newly acquired user, we spawn a new instance of the single user decoder module (for that user), and provide it with the initial channel parameter estimates from the initial acquisition module. This new user is then added to the set of previously acquired users and a soft estimate of the newly acquired user is subtracted to form an updated the residual signal for the next iteration 35. If no new user is acquired, then the output of the last element of the set of previously acquired users is used as the residual signal for the next iteration (ie signal 35=signal 33).

Figure 4:
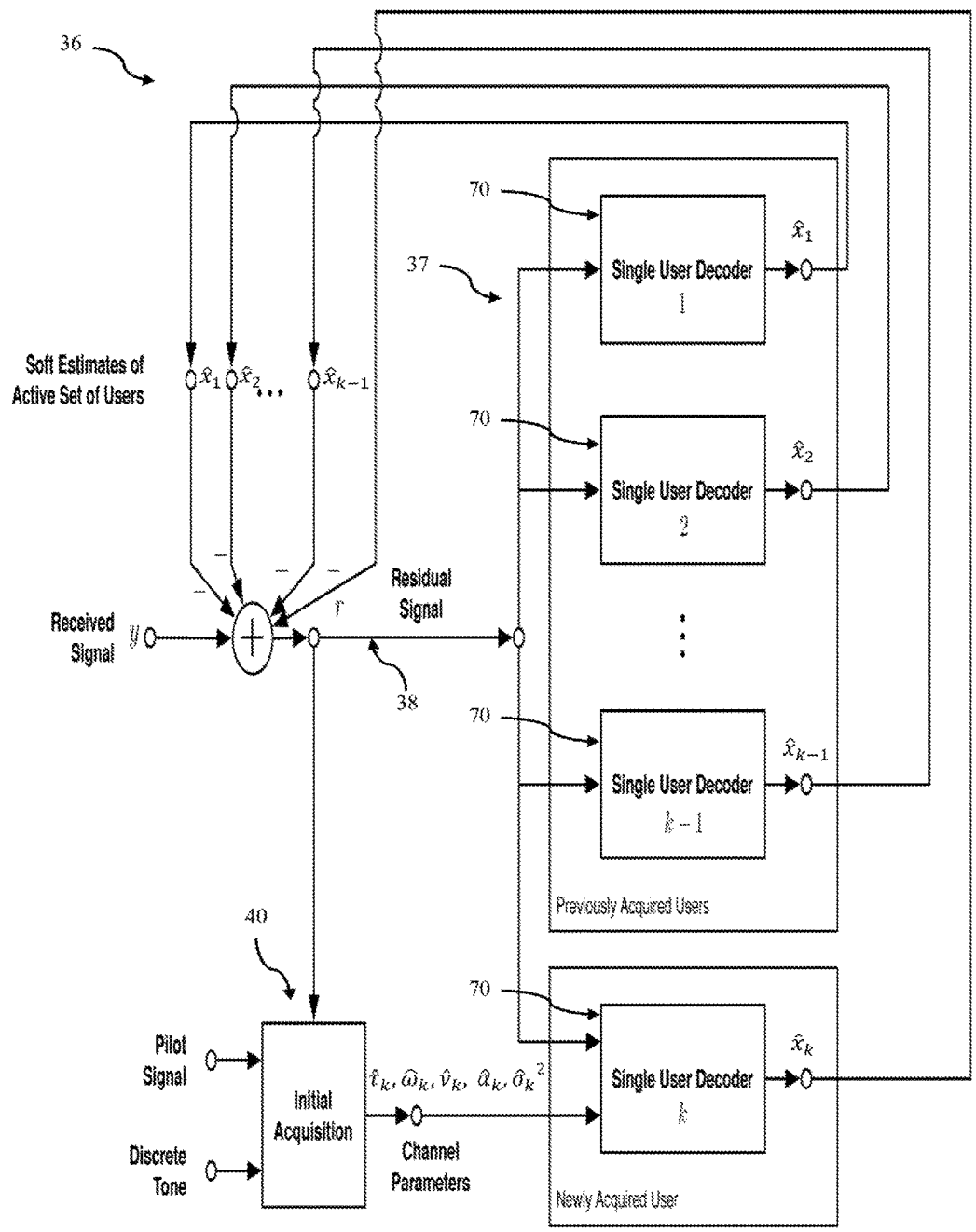
FIG. 4 is a block diagram of a of a multiuser receiver that performs parallel processing according to an embodiment.

In one embodiment, the receiver's decision whether to acquire a new user is based on the decoder quality metric of all previously acquired users. The order in which the set of previously acquired users is processed is based on some parameters. In one embodiment, the set of previously acquired users are processed in the order in which they were acquired. In one embodiment, the set of previously acquired users are processed in decreasing order of their estimated signal strength. In one embodiment, the set of previously acquired users are processed in decreasing order of their estimated signal-to-noise ratio. In one embodiment, the set of previously acquired users are processed in a random order that is changed in every multiuser iteration. In one embodiment, the receiver may choose to skip processing of a single user decoder and use the previous soft estimate as the updated soft estimate $\hat{x}$. This decision may depend on a decoding quality metric. In one embodiment, the receiver skips processing a single user decoder when the decoding quality metric exceeds a predetermined threshold. In one embodiment, the receiver may repeatedly activate a single user decoder with updated channel parameters and updated soft estimates before proceeding to the next member of the set of previously acquired users. In one embodiment, the receiver may process the whole set of active users based on the residual signal and then subtract all updated soft estimates from the received signal to form the residual signal for the next iteration. In this case, processing of the single user decoders can be performed in parallel. An embodiment of a multiuser decoder with a parallel implementation 36 is shown in FIG. 4 in which the parallel block 37 comprises k-1 instances of single user decoders 70 each of which produce a soft estimate of the signal contributions from the associated user which is subtracted from the previous residual signal to produce an updated residual signal 38. After each iteration an instance of an initial acquisition module 41 is used to search for additional signals, and if a new user is acquired, the user is added to the set of users and decoding is performed in parallel block 37. The "previous channel parameters", "updated channel parameters and decoder quality metric" and "previous soft estimate" as input and output of the single user decoders are omitted. In one embodiment, the receiver may combine any of the methods above.

Figure 5:
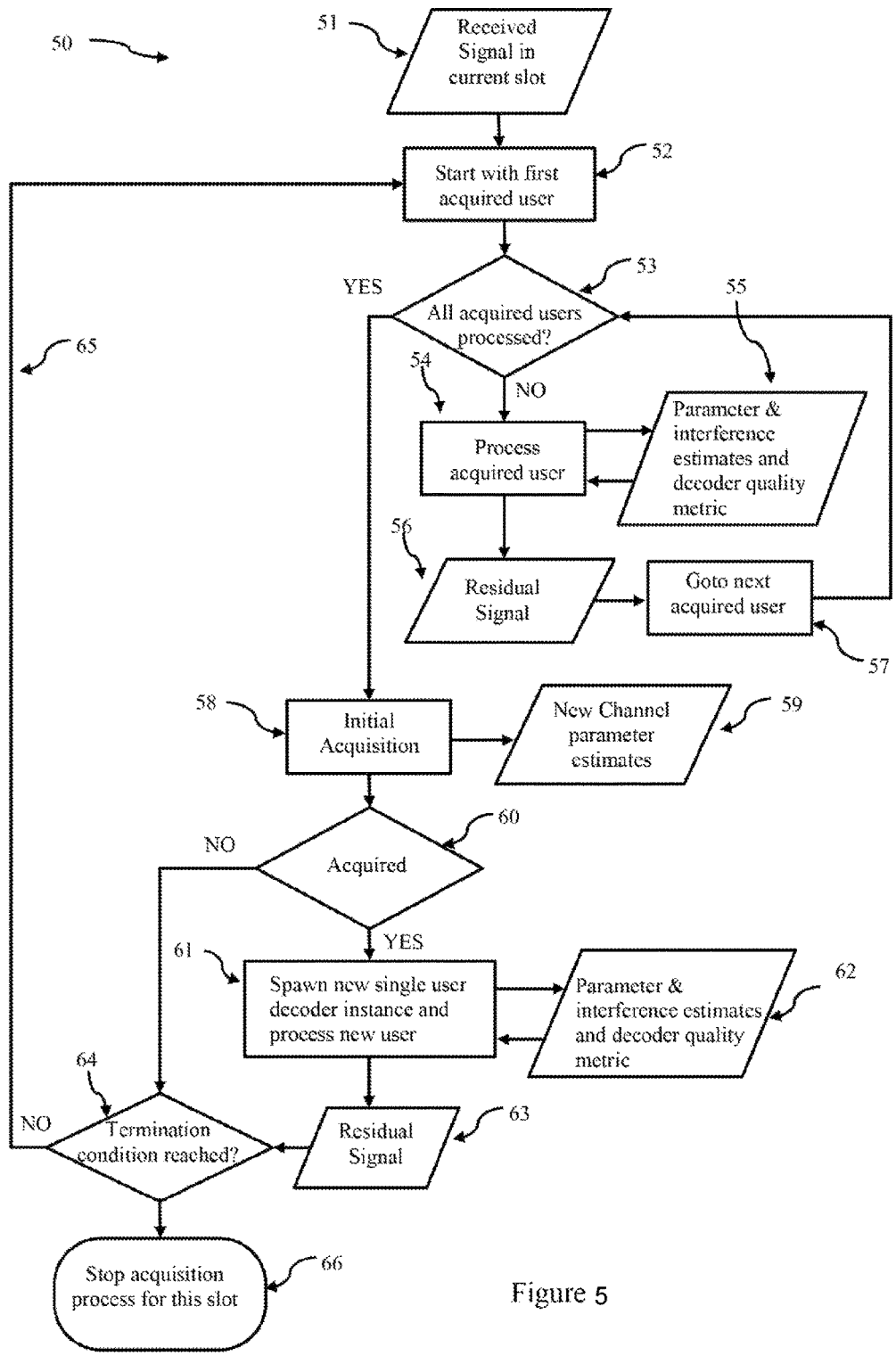
FIG. 5 is a flowchart of the multiuser receiver according to an embodiment.

FIG. 5 provides a top-level flow chart 50 for the multiuser decoder that implements a method for operation of a multiuser receiver in a slot based wireless communication system to detect multiple transmissions via iterative soft interference cancellation. FIG. 5 focuses on the control flow and details of the acquisition process itself are described later. At step 51 an initial signal is received in the current slot. The acquisition process then starts 52 with the first acquired user in the set of acquired users using the received signal as the initial residual signal. At step 53 a test is performed to determine that all acquired users have been processed. In the first iteration the set of all acquired users is the empty set, and thus all acquired users have been processed. However, in some embodiments the set of acquired users could be populated with a set of expected users, for example based on slot scheduling information and previous channel estimate information. In the cases that all acquired users have been processed (YES outcome of block 53) then an initial acquisition process is performed 58 which attempts to acquire one or more as yet undetected users from the residual signal. Acquisition of a new user requires estimation of the channel parameters 59 required to commence decoding of that user, and these parameters may include the time offset $\tau$, frequency offset $\omega$, frequency rate $\upsilon$, complex gain $\alpha$ and noise variance $\sigma^2$, where all estimates correspond to the newly acquired user k. If a new user is acquired (YES of block 60), then the new user is then added to the set of acquired users, and a new single user decoder is spawned to process the new user 61. At block 62 the single user decoder uses the current set of channel parameters for the user (estimated in block 59) to generate a soft estimate of the signal contribution of the selected user (ie an interference estimate). Updated channel parameter estimates and decoder quality metrics can also be obtained. The soft estimate of the signal contribution of the user is then subtracted from the current residual signal to obtain an updated residual signal 63. A check is then made to see if a termination condition 64 has been reached or not. This point is also reached in the case that no new user was detected in the acquisition stage (NO of block 60). If the termination condition is not yet met (NO of block 64) then the next iteration of the iterative decoding is performed 65 using the current residual signal.

Thus, if the termination condition was not met, and/or all acquired users have not been processed (NO of block 53), then a processing loop is performed over the set of all acquired users. This is illustrated in FIG. 5. A user in the set of acquired users is selected and processed at step 54. This processing comprises decoding the current residual signal using 55 to generate a soft estimate of the signal contribution of the selected user (ie an interference estimate). Updated channel parameter estimates and decoder quality metrics can also be obtained. The soft estimate of the signal contribution of the user is then subtracted from the current residual signal to obtain an updated residual signal 56, and a new user in the set of acquired users is selected. This loop process (blocks 54, 55, 56 and 57) continues until all acquired users have been processed and there are no more acquired users to be processed (YES of block 53). A further initial acquisition process 58 is then performed to attempt to acquire one or more users in the current residual signal (ie after processing the currently known users and removing estimates of their signal contributions to produce a residual signal with reduced interference).

In the case a termination condition was met (YES of block 64), then the acquisition process for this slot is stopped 66 and processing of this slot is terminated. In one embodiment, the termination condition is satisfied if the number of iterations of the multiuser decoder exceeds a threshold. In one embodiment, the termination condition is satisfied if the energy of the residual signal drops below a threshold. In one embodiment, the termination condition is satisfied if a maximum number of users are acquired. In one embodiment, the termination condition is based on the parameter estimates of the initial acquisition module. For example, a confidence interval can be associated with each channel parameter (or other parameter) estimated. If one or more of these confidence intervals exceeds a threshold, or is outside of a predefined range such that it is unlikely that a signal is present then the iteration can be terminated. In one embodiment, a combination of the conditions above is used.

Figure 6:
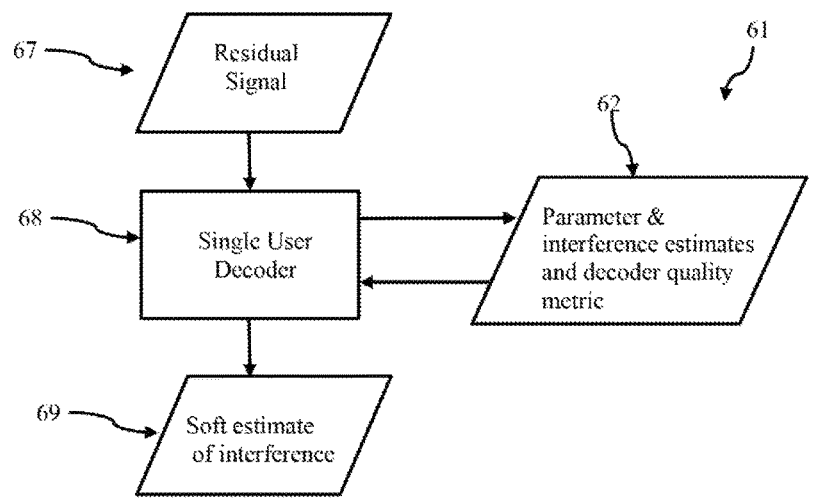
FIG. 6 is a flowchart of single user decoder process in a multiuser receiver according to an embodiment.

FIG. 6 provides a flow chart for one instance of the single user decoding module 68, for example spawned at block 61 (or in use at block 54). A residual signal 67 (eg from blocks 63 or 56 in FIG. 5) is provided as input to the instance of the single user decoder module 68. The single user decoder module uses channel parameter estimates 62 to generate a soft estimate of the signal contribution of the selected user 69 (ie an interference estimate) and generates updated channel parameter estimates and decoder quality metrics 62. The generation process can be performed iteratively. The signal contribution can be subtracted from the residual signal 67 to obtain an updated residual signal 63 (or 56 in the case of block 54). There is one instance of the single user decoder module for each member of the current active set. The detailed operation of the single user decoder module is described later below.

Initial Acquisition

Figure 7:
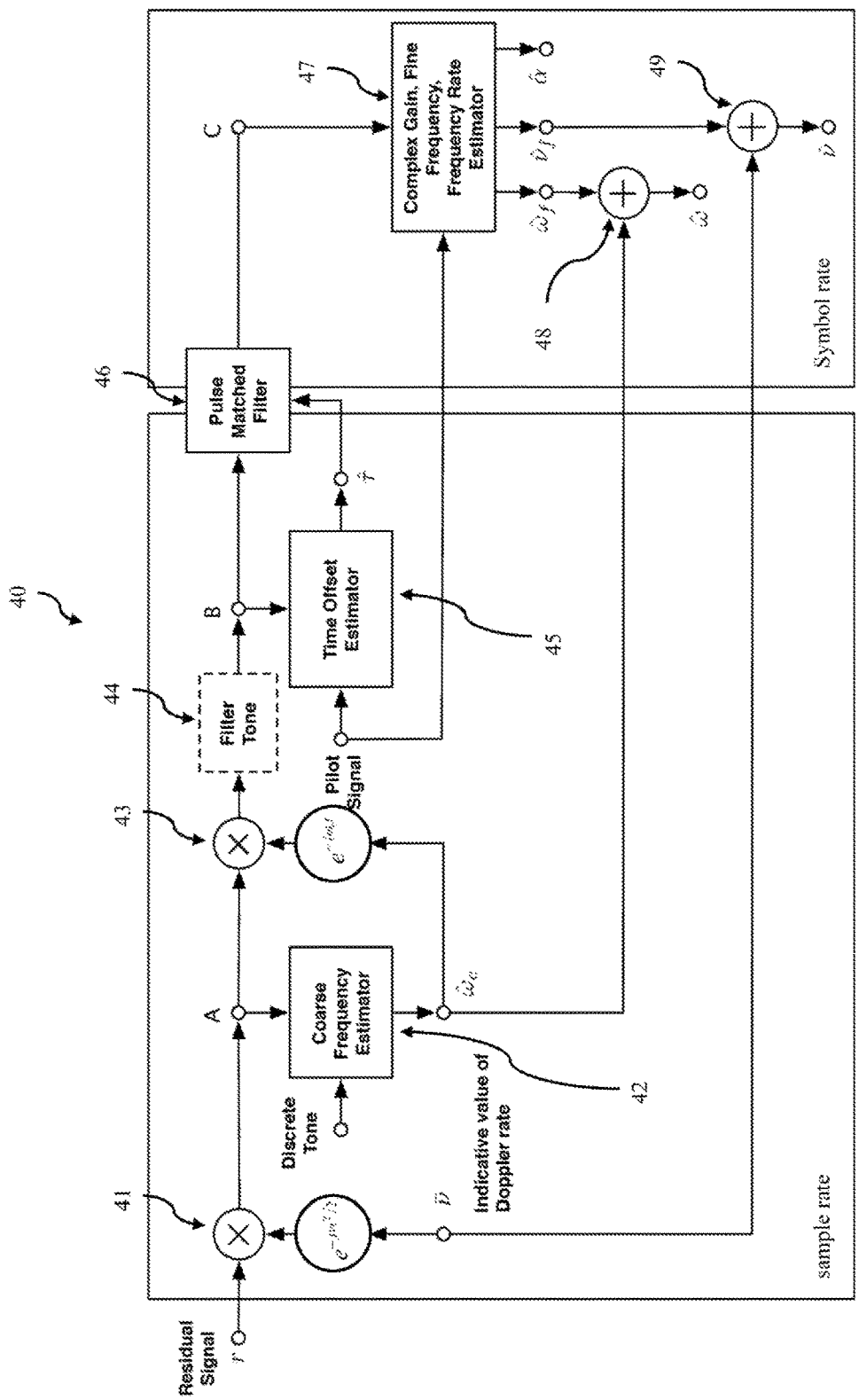
FIG. 7 is a block diagram of a module for performing initial acquisition of a transmitted signal according to an embodiment.

FIG. 7 provides a block diagram for the initial acquisition module 40, which at each iteration takes as input the oversampled residual signal r. In some embodiments, Doppler rate compensation 41 is performed. In some applications, a range of possible Doppler rates (Hz/second) is known a-priori. For example, in a low earth orbit satellite application, the Doppler rate is always negative, with known maximum magnitude. In other scenarios, this rate is unknown, or is assumed to be zero. In such cases, the initial Doppler rate compensation can be omitted. Let $\bar{v}$ be an indicative value of the Doppler rate (Hz/second). This value may for example be the midpoint of the range of Doppler rate, or some other value. As a first step, this Doppler rate is removed 41 from the received signal, by multiplying the received samples with a complex exponential $e^{-j\bar{v}t^2/2}$ where the time index t takes values corresponding to the sample instances.

Following this initial compensation for Doppler rate 41, an initial, coarse frequency offset estimate $\omega_c$ radians/second is computed by coarse frequency estimator 42. This coarse offset is removed 43 via multiplication by $e^{-j\omega_c t}$. Optionally, the discrete tone 28 may be removed by a non-coherent filter 44. The resulting signal is then fed into a time offset estimator 45, which estimates the temporal offset $\hat{\tau}$ with respect to the nominal slot boundary. The signal is then fed into a filter 46 which is matched to the transmission pulse. The sample instance of this filter is set according to the time offset $\hat{\tau}$.

The resulting symbol-rate signal is then used to find estimates of the complex signal gain $\hat{\alpha}$, refinements to the frequency offset (fine frequency offset ($\omega_f$), and the frequency rate of change $\hat{v}_f$ by Estimator 47. Then the final estimate of the frequency offset is obtained as the sum of the initial coarse frequency offset and the fine frequency estimate 48. The final estimate of the frequency rate of change is obtained as the sum of the initial coarse frequency rate of change and the fine frequency rate of change estimate 49.

In one embodiment, the acquisition coherently removes the discrete tone 28 after obtaining all estimates. In this case, the block Filter Tone 44 is disabled and after estimation, the tone is cancelled coherently at sample level from the signal at point B or at symbol level from the signal at point C.

In another embodiment, estimation of complex gain, fine frequency and frequency rate is performed iteratively by estimator 47 with the coherent cancellation of the discrete tone 28.

As discussed previously the coarse frequency estimator 42 searches for the predefined signal 28 inserted by a transmitter (or user) to aid acquisition of the transmitter (or user) and thus increase the throughput and efficiency of the system.

In one embodiment, in which the predefined signal to aid acquisition 28 is a discrete tone, the coarse frequency estimator is implemented via maximisation of the periodogram of the signal at point A in FIG. 7. This is facilitated by the presence of the discrete tone 28 which was added at the transmitter. The periodogram may be implemented via a zero-padded discrete Fourier transform, where the amount of zero padding is chosen to improve the frequency resolution (by providing narrower frequency bins in the Fourier transform). The transform may be implemented directly, or using a fast Fourier transform or may even exploit the zero-padding to achieve a further complexity reduction. The maximisation may be performed, in two steps, first obtaining the bin of the periodogram with largest absolute value, and secondly performing a numerical optimisation (eg Newton's method) in the region of that frequency.

The coarse frequency estimate $\hat{\omega}_e$ is obtained from the frequency corresponding to the maximum absolute value of the periodogram by subtracting the frequency of the discrete tone 28. In one embodiment, the frequency range for the maximisation may be restricted to allow for acquisition in specific frequency intervals or avoid acquisition in specific frequency intervals. In one embodiment, this approach is used to exclude one or more frequency intervals within which the multiuser decoder is not making sufficient progress. For example, two or more users may overlap significantly in time and frequency such that the multiuser decoder is unable to decode any of those users. In this case the residual signal may still contain significant energy in the corresponding time-frequency interval. As a result, one or more weaker users in other time-frequency intervals may not be acquired by the initial acquisition stage, which instead re-acquires one of the uncancelled, but non-decodable users. In the embodiment, one or more frequency intervals are excluded by excluding the corresponding bins of the periodogram from the maximisation when obtaining to coarse frequency estimate 42 as described above.

In one embodiment, where the signalling constellation is any form of phase shift keying, the time offset estimator is implemented using any of the methods described in PCT/AU2014/000139, taking the signal at point B in FIG. 7 as input. This method uses both the known pilot data, and the unknown data portion of the signal to provide an estimate of the time offset.

Gain, Phase, Fine Frequency, Frequency Rate Estimator 47.

In one embodiment, the complex signal gain, as well as a refinement of the frequency offset and the rate of change of the frequency offset are estimated from the signal at point C in FIG. 7 by estimator 47 as follows.

A two-dimensional grid of frequency offset values and frequency rate values is pre-defined. This grid may be uniform or non-uniform. The minimum/maximum and spacing of this grid in each of the dimensions is chosen ahead of time, and may be determined by experiment. For each grid point $\omega_f$, $\upsilon_f$ the signal from C is adjusted by multiplication by $e^{-j\hat{\omega}_f t - j\hat{\upsilon}_f t^2/2}$ where t is now the symbol timing. This compensated signal is then provided to any of the algorithms from PCT/AU2013/001064. This returns estimates of the gain and phase of the signal, as well as the corresponding squared error. If this squared error is lower than any of the squared errors resulting from previous grid points, then the complex gain estimate $\hat{\alpha}$ is set to this current estimate. The value of the squared error is also stored as the best value seen so far. The fine frequency estimate $\hat{\omega}_f$ and frequency rate estimate $\hat{\upsilon}_f$ are set to the corresponding values for that grid point. The algorithm then proceeds to the next grid point. When all grid points have been considered, the process concludes, and the algorithm outputs the values $\hat{\alpha}$, $\hat{\omega}_f$, $\hat{\upsilon}_f$.

Exploitation of Channel Parameter Correlation,

The channel parameters, eg, complex gain, time offset, frequency offset and frequency rate of change, may be correlated due to the underlying mechanisms of the channel that include the propagation characteristics and geometrical properties of the propagation channel. This correlation can be exploited for complexity reduction and/or improved estimation accuracy in the initial acquisition stage, particularly in the case where the system is under heavy loads. For the example of a ground-based transmitter and a satellite-based receiver, the parameters time offset, frequency offset and frequency rate might be completely determined by the position of the terminal relative to the satellite. Hence, not all combinations of channel parameters are possible, which can be exploited to reduce the search range of acquisition algorithms or to improve the estimation accuracy.

Packet data may be used to generate one or more pointers to other packets transmitted from the same terminal. A pointer may imply parameters such as slot schedule and transmitter applied offsets (as described above) for future and/or past transmissions. The receiver may exploit this information for complexity reduction and/or improved estimation accuracy during acquisition. Packet pointers may be carried within the transmitted data, either explicitly or in a compact form, or they may be derived. In one embodiment, the packet transmit schedule and/or transmitter applied offsets are chosen using a pseudo-random sequence that was seeded using a number identifying the transmitter, as described in the transmitter section. The state of the pseudo-random sequence is calculated for a received packet, using the terminal identifier, frame number and slot number at time of reception. The sequence state is then used to derive future and/or past states and hence the schedule for future and/or past transmissions. In another embodiment, the packet data contains the state of the pseudo-random sequence.

Receive processing may also combine information derived from packet pointers with knowledge of system dynamics, such as transmitter and receiver position and speed. For example, a packet pointer may imply a scheduled slot in which another packet from the same transmitter will appear, along with the value of a transmitter applied frequency offset. In order to aid acquisition of the packet, the value of channel parameters at the scheduled slot (such as gain, time offset, frequency offset and frequency rate of change) may be estimated based on knowledge of the system dynamics. The transmitter applied frequency offset obtained from the packet pointer information may be added to the estimated channel frequency offset.

Single User Decoder Module

Figure 8:
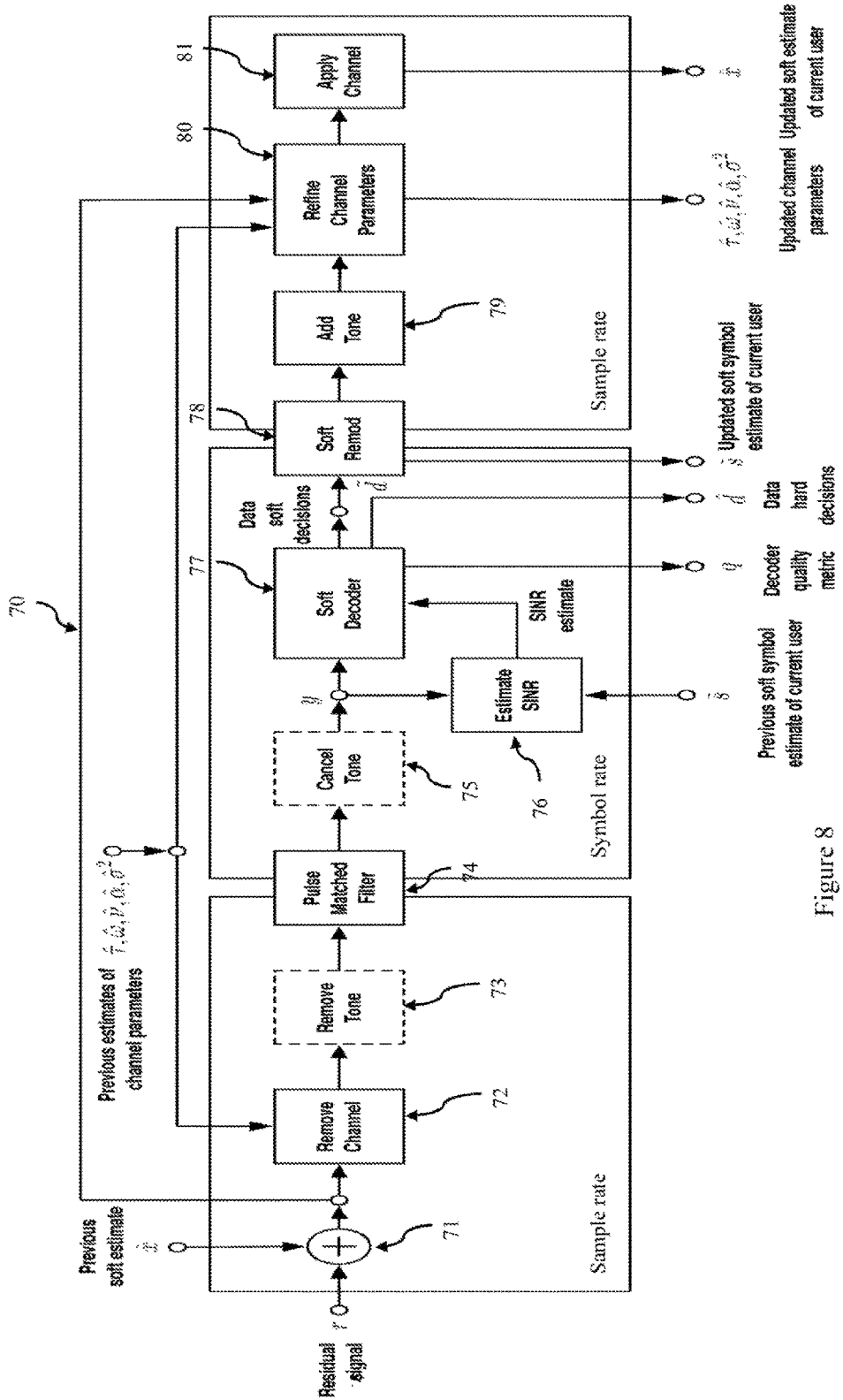
FIG. 8 is a block diagram of a single user decoder module in a receiver according to an embodiment.

The single user decoder module 70 is shown in FIG. 8. It provides updated versions of the soft estimate $\hat{x}_k$ and the channel parameters of the current user $\hat{\tau}_k$, $\hat{\omega}_k$, $\hat{\upsilon}_k$, $\hat{\alpha}_k$, $\hat{\sigma}_k^2$ and the hard decisions of the data $\hat{d}_k$ (in FIG. 8 the user subscripts k has been dropped for clarity).

The remove channel block (or channel removal module) 72 removes the (estimated) effect of the communications channel for the user of interest from the residual signal. Considering user k, the estimated (time varying) Doppler offset and phase offset is removed by multiplying the residual signal r[t] by the complex sinusoid to obtain:

$$r'[t] = r[t]e^{-j\left(\hat{\omega}_k t + \frac{\hat{v}_k t^2}{2}\right)} \quad \text{Equation 1}$$

where the discrete time index t indexes samples. In one embodiment, compensation for complex gain is performed in two steps, first rotating samples to obtain $r'[t]e^{-j\angle\hat{\alpha}_k}$ where $\angle\hat{\alpha}_k$ is the phase of $\hat{\alpha}_k$. The rotated samples are then output from the channel removal block. The second step is performed at the output of the pulse matched filter, where symbols are divided by the magnitude of the complex gain estimate, $|\hat{\alpha}_k|$.

The estimated time offset $\hat{\tau}_k$ can be regarded as consisting of two components: an integer number of sample periods and a fractional (sub-sample) offset. The integer number of sample periods is removed via a re-indexing of the time index. The remaining fractional offset is accounted for in the sample timing of the pulse matched filter.

The remove tone block (or remove predefined signal for coarse acquisition block) 73 removes the discrete tone at the sample rate. In one embodiment, the discrete tone is removed via a non-coherent filter. In another one embodiment, the discrete tone is subtracted coherently (cancellation). The remove tone block is optional.

The pulse matched filter 74 converts the signal to one sample per symbol. It is a digital filter matched (impulse response is the time-reversed complex conjugate) to the pulse shape chosen by the transmitter. The sampling instance is chosen according to the fractional offset component of $\hat{\tau}_k$. In the first iteration for a particular user (first activation of the single user module after instantiation), some computation can be saved by using the pulse matched filter output from point C in FIG. 7 (since no previous user contribution needs to be added back in). In subsequent iterations the pulse matched filter is still required.

If the discrete tone has not been removed before the Pulse Matched Filter (ie via remove tone block 73), it can be removed at a symbol level by coherent cancellation using the Cancel Tone block 75. This reduces the complexity compared to a coherent cancellation at the sample rate.

The output of the Pulse Matched Filter 74 (optionally after tone cancellation) is used to estimate the signal-to-interference-plus-noise ratio (SINR) in the estimate SINR block 76. As described above, the transmitted signal carries pilots and data Let $\mathcal{P}$ be the set of indices describing the positions of the pilot symbols and let $\mathcal{D}$ be the set of position indices that correspond to the data symbols. The transmitted symbols are therefore estimated as $$\hat{u}[i] = \begin{cases} p[i], & i \in \mathcal{P} \\ \hat{s}[i], & i \in \mathcal{D} \\ 0, & \text{otherwise} \end{cases} \quad \text{Equation 2}$$

where p[i] are the pilot symbols known to the receiver and ŝ[i] are the hard decisions for the most recent soft symbol estimates š[i]. The sets $\mathcal{P}$ and $\mathcal{D}$ are disjoint, ie $\mathcal{P} \cap \mathcal{D} = \emptyset$ and the union $\mathcal{P} \cup \mathcal{D}$ contains all those indices where symbols are transmitted.

The SINR is estimated at symbol level after removing the effect of the data modulation (modulation stripping). Modulation stripping is achieved by multiplying the symbol sequence at the output of the Pulse Matched Filter y[i] with the complex conjugate of û[i]. The SINR estimate, denoted $\hat{\gamma}$, is then obtained as $$\hat{\gamma} = \frac{|\hat{\mu}|^2}{\hat{\sigma}^2} \quad \text{Equation 3}$$

where $\hat{\mu}$ and $\hat{\sigma}^2$ are estimates of the mean and variance of the modulation-stripped signal y[i]û*[i] and are given by $$\hat{\mu} = \frac{1}{|S|} \sum_{i \in S} y[i]\hat{u}^*[i] \quad \text{Equation 4}$$

$$\hat{\sigma}^2 = \frac{1}{|S|} \sum_{i \in S} |y[i]\hat{u}^*[i] - \hat{\mu}|^2 \quad \text{Equation 5}$$

where $\delta \subseteq \mathcal{P} \cup \mathcal{D}$. That is, a subset or all pilot and data symbols may be used.

Figure 9:
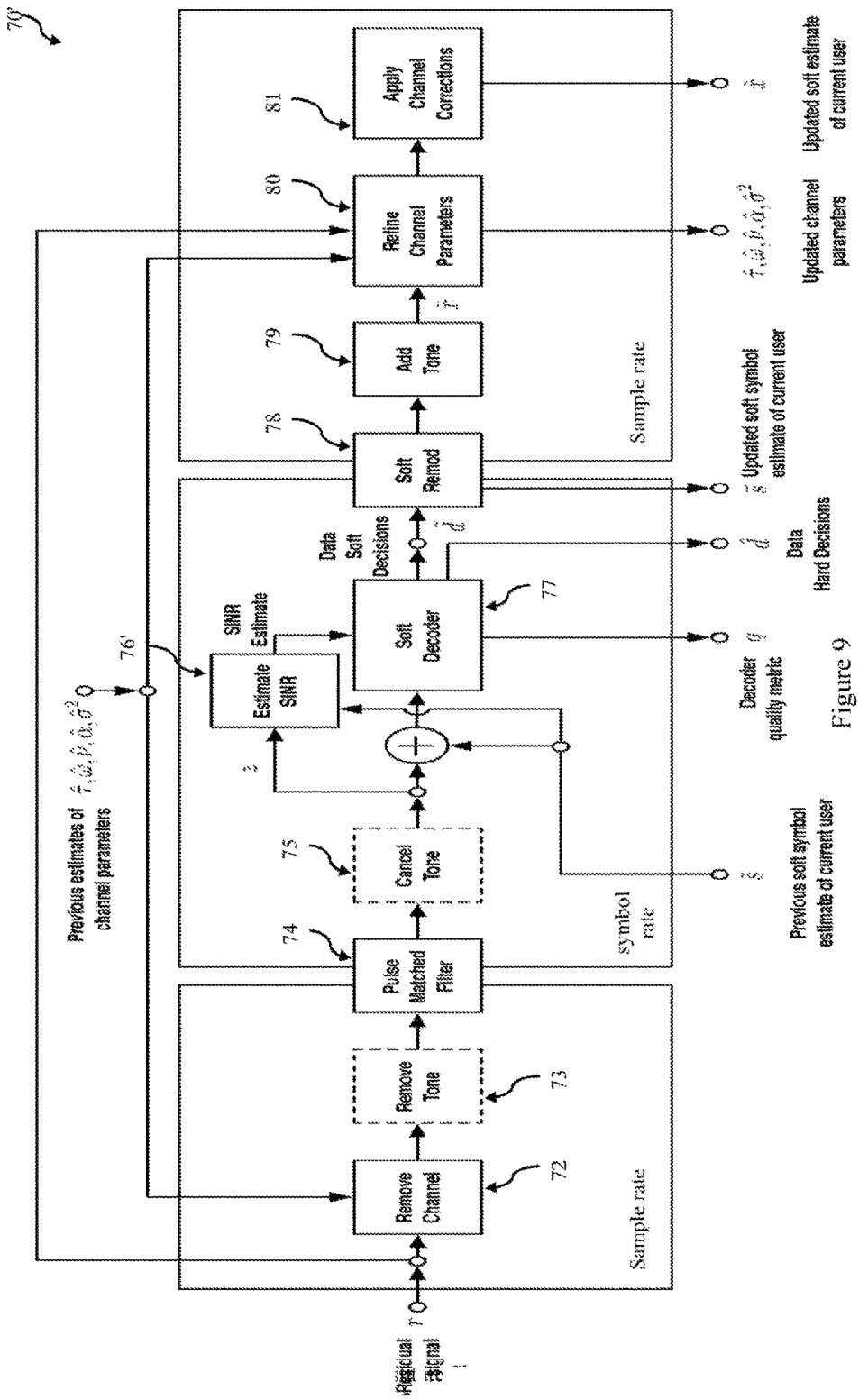
FIG. 9 is a block diagram of a single user decoder module with modified SINR estimation in a receiver according to an embodiment.

In other embodiments, the SINR estimator $\hat{\gamma}$ may be replaced by any SINR estimator known from the literature. In another embodiment, a single user decoder 70' with a modified SINR estimator 76' as shown in FIG. 9 is used. In this architecture, the signal power is estimated form the most recent soft symbol estimates š[i] and the interference-plus-noise power is estimated from the residual signal at the output of the Pulse Matched Filter z[i] (optionally after tone cancellation). For symbol position i, an SINR estimate $\hat{\gamma}[i]$ is obtained as $$\hat{\gamma}[i] = \hat{\sigma}^2[i]/\hat{p}_k[i]$$

where $\hat{P}_s[i]$ and $\hat{\sigma}^2[i]$ are estimates of the signal power and interference-plus-noise power for symbol position i, and are given by $$\hat{P}_s[i] = \frac{1}{|S[i]|} \sum_{j \in S[i]} |\hat{s}[j]|^2, \quad \text{Equation 7}$$

$$\hat{\sigma}^2[i] = \frac{1}{|S[i]|} \sum_{j \in S[i]} |z[j]|^2. \quad \text{Equation 8}$$

Here, δ[i] is the set of symbol positions taken into account when estimating $\hat{\gamma}[i]$. The set δ[i] is an arbitrary subset of all symbol positions, that is $\delta[i] \subseteq \mathcal{P} \cup \mathcal{D}$. In one embodiment, δ[i]=i. In another embodiment, δ[i]={i−L, . . . , i−1, i, i+1, . . . i+L}, ie a contiguous block of 2L+1 symbols centred about symbol index i is used. In another embodiment, $\delta[i]=\delta=\mathcal{P} \cup \mathcal{D}$ for all $i \in \mathcal{P} \cup \mathcal{D}$. In this case, the entire set of symbols is used for all positions i such that $\hat{\gamma}[i]=\gamma$ for all $i \in \mathcal{P} \cup \mathcal{D}$.

In one embodiment, the SINR estimator from Equation 3 or any of the SINR estimators known form the literature are used in the early iterations of multiuser decoding. In later iterations, the architecture then switches to the SINR estimator from Equation 6.

The soft decoder 77 performs the steps of removing pilots, demodulating, deinterleaving, forward error correction, Decoder Quality Metric (DQM), interleaving and insertion of pilots. Any pilot sequence introduced in the transmit sequence (see above) will be removed b deleting the pilot positions. The demodulator then computes soft decisions (log-likelihood ratios) of the corresponding bits based on the complex received symbol and the modulation scheme (see above). These computations can be performed, eg, using the maximum-aposteriori (MAP) algorithm or any approximation of this algorithm. Deinterleaving of the sequence of soft decisions is then performed where the deinterleaver is the inverse of the inter leaver described above. Forward error correction is performed to decode the forward error correcting code using a soft-input soft-output decoding, algorithm which may include but is not limited to the sum-product algorithm, the BOR algorithm or any of their approximations. In one embodiment, the soft-outputs of the decoder are extrinsic log-likelihood ratios (or any other representation, eg, probabilities). In another embodiment, the soft-outputs of the decoder are a-posteriori ratios or a function of extrinsic and a-posteriori log-likelihood ratios. The decoder also provides hard-decisions of the data $\hat{d}_k$ after descrambling. A decoder quality metric (DQM) or "decoder state" is derived from the decoding results that can be used by the multi-user detector. In one embodiment, the DQM is based on the average magnitude of the log-likelihood ratios. In another one embodiment, the DQM is based on the number of unsatisfied parity-check equations of the error correcting code. The interleaver re-interleaves the soft-outputs of the output of the decoder as described above and the pilot inserter reinserts the pilot sequence as described above. As the pilot sequence is known to the receiver, the soft-estimates for the pilots contain no uncertainty, The soft-remodulator 78 converts the soft-decisions $\tilde{d}$ of the output of the soft decoder 77 (including, pilots and interleaving) to soft-estimates of complex transmit samples $\tilde{s}$. The input to the soft remodulator is a vector of soft-estimates from the soft decoder where each soft-estimate corresponds to one bit.

Let $\mathcal{A}$ denote the set of constellation points. The soft-estimates from the soft decoder are partitioned in groups of size $\log_2 |\mathcal{A}|$. Each group of soft-estimates corresponds to one symbol. A soft-symbol is computed as:

$$\tilde{s}[k] = \Sigma_{s \in \mathcal{A}} \{ s \Pi_{i=1}^{\log_2 |\mathcal{A}|} Pr(b_i[k]=s_i) \} \qquad \text{Equation 9}$$

where $b_i[k]$ denotes bit i in group k and $s_i$ denotes position i of the binary sequence mapped to symbol s.

The soft-symbols $s_k$ are then passed through the pulse-shape filter and the output of the pulse-shape filter forms the output of the soft remodulator.

A discrete tone for the predefined symbol used for coarse acquisition) is added to the soft-estimates of the complex transmit samples as described above by discrete tone adder module 79.

The channel estimates are then refined by channel parameter updater block 80. The soft-estimates of the complex transmit samples (including the discrete tone) are used to refine the estimates of gain, phase, frequency and frequency rate.

A two-dimensional grid of time offset values $\tilde{\tau}$ and frequency rate values $\tilde{\upsilon}$ is pre-defined. The minimum/maximum and step size of grid in each of the dimensions is chosen ahead of time, and may be determined by experiment. For each grid point $(\tilde{\tau}, \tilde{\upsilon})$, the soft transmit samples are shifted in time by $\tilde{\tau}$ seconds. The time shift $\tilde{\tau}$ can be regarded as consisting of integer and fractional offsets (see above). The integer offset is applied by a re-indexing of the time index. The fractional offset may be achieved by means of interpolation or, in the preferred embodiment, by using a transmit pulse filter that is shifted by the fractional time offset when remodulating the signal in the block Soft Remodulator.

In one embodiment, the two-dimensional grid is reduced to one dimension by considering out a single time offset value $\tilde{\tau}$. In one embodiment, $\tilde{\tau}$ is set to the most recent time offset estimate for the current user, ie $\tilde{\tau}=\hat{\tau}_k$. Let the soft transmit samples after the time shift by $\tilde{\tau}$ seconds be denoted by $x_{\tilde{\tau}}[t]$, where the discrete-time index t indexes samples.

For each grid point $(\tilde{\tau}, \tilde{\upsilon})$, the residual signal samples r [t] are multiplied with the complex conjugate of $x_{\tilde{\tau}}[t]$ and are adjusted by multiplication with $e^{-j\tilde{\upsilon} t^2/2}$. Maximisation of the periodogram of the resulting signal:

$$r[t]x_{\tilde{\tau}}*[t]e^{-j\tilde{\upsilon} t^2/2} \qquad \text{Equation 10}$$

then yields a frequency estimate $\tilde{w}$, which corresponds to the bin of the periodogram with largest value.

If this maximum value of the periodogram is larger than any of the maximum values resulting from previous grid points, then the refined time offset estimate $\hat{\tau}_k$ and frequency rate estimate $\hat{\upsilon}_k$ are set to the current grid point values $(\tilde{\tau}, \tilde{\upsilon})$. The frequency offset estimate $\hat{\omega}_k$ is set to the corresponding value $\tilde{\omega}$. The maximum value of the periodogram is also stored as the best value seen so far. The algorithm then proceeds to the next grid point. When all grid points have been considered, the process concludes, and the algorithm outputs the values $\hat{\tau}_k, \hat{\omega}_k, \hat{\upsilon}_k$.

The periodogram may be implemented in any of the ways described above, hi the preferred embodiment, the estimates and $\hat{\omega}_k$ and $\hat{\upsilon}_k$ are further refined via a numerical optimisation of the periodogram (eg via Newton's method) in the region of the current estimates. Finally, a refined complex gain estimate is obtained as $$\hat{\alpha}_k = \frac{\sum_t r[t] x^*_{\tilde{\tau}_k}[t] e^{-j(\hat{\omega}_k t + \hat{\upsilon}_k t^2/2)}}{\sum_t |x_{\tilde{\tau}_k}[t]|^2} \qquad \text{Equation 11}$$

Similar to the initial acquisition stage, the refinement stage may exploit the correlation between the parameters to be estimated for complexity reduction and/or improved accuracy of the estimates (see above).

In the final step, the updated channel estimates $\hat{\tau}_k, \hat{\omega}_k, \hat{\upsilon}_k$ and $\hat{\alpha}_k$ are applied by a channel application module 81 to the soft-estimates of the complex transmit signal to obtain an updated soft-estimate of this user's contribution to the received signal $\hat{x}_k$.

Figure 10:
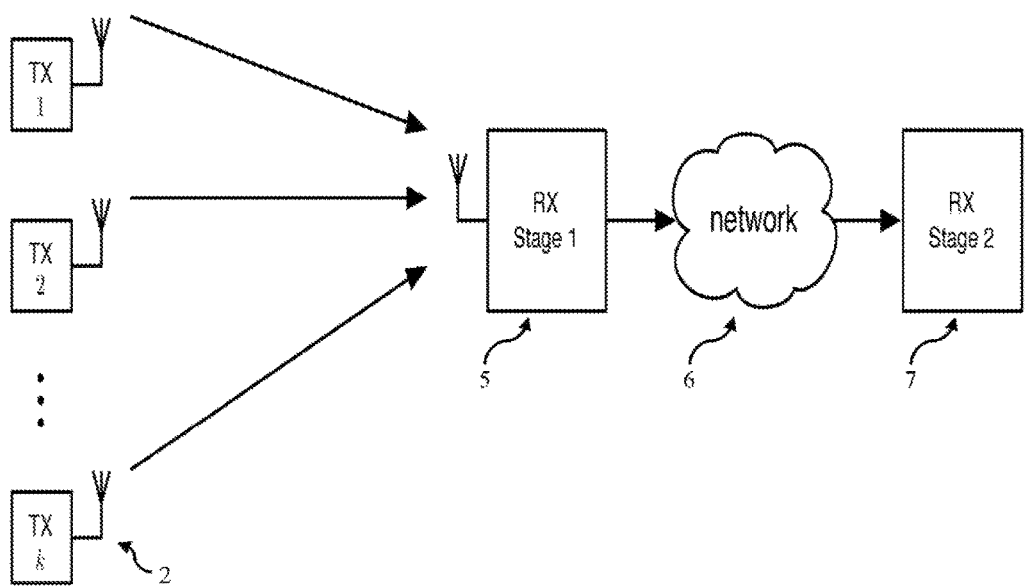
FIG. 10 is a schematic diagram of a multiple access communications with distributed receiver processing according to an embodiment.

The receiver may be implemented in a distributed manner. FIG. 10 shows one embodiment in which receiver processing of the multiple transmissions from the plurality of transmitters 2 is segmented into two stages, where the outputs of the first stage 5 feed a second stage 7 via some network 6. In the one embodiment the first stage of receive processing is conducted onboard a satellite and the second is conducted on the ground using outcomes forwarded from the first stage.

In one embodiment the first stage of processing comprises a front end which samples the received channel and then forwards the samples to complete the receive processing at the second stage. In another embodiment the first stage of processing comprises a front end which samples the received channel and a multiuser receiver that can support a limited number of users, eg a single user receiver. Samples may be compressed prior to forwarding to the second processing stage, eg by removing successfully decoded slots and empty slots. Acknowledgements may be provided based on decoder success, as described in PCT/AU2013/001079. In another embodiment the first stage of processing comprises a front end and acquisition stage. Based on acquisition results the samples may be compressed prior to forwarding to the second processing stage, eg by removing empty slots. Acquisition results may be used to drive predictive acknowledgements, as described in PCT/AU12013/001079. In another embodiment the first stage of processing comprises a front end, acquisition and low-complexity multiuser decoder stage. Internal values of the multiuser decoder may be forwarded to the second processing stage. Early examination of internal multiuser decoder parameters may be used to drive predictive acknowledgements, as described in PCT/AU2013/001079.

Other embodiments include combinations of the approaches described above. For example, a satellite first stage processor comprising a front end, acquisition and low-complexity multiuser decoder may be used to decode packets and forward them opportunistically via a nearby low data rate gateway for low latency delivery. Received channel samples may then be forwarded via a high data rate link to a ground station at a later point in time and processed on the ground.

Figure 11:
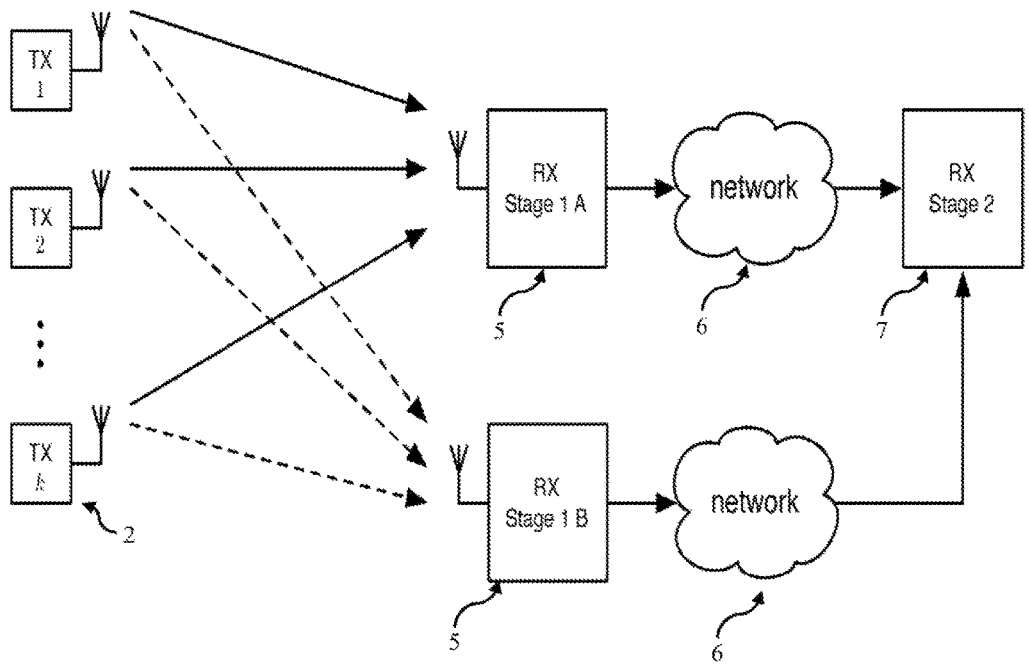
FIG. 11 is a schematic diagram of a multiple access communications with distributed receiver processing and multiple first stages according to an embodiment.
Figure 12A:
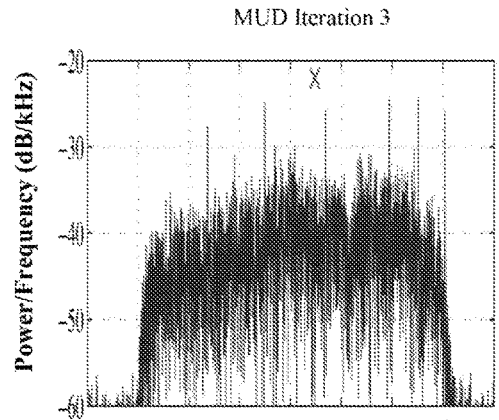
Figure 12B:
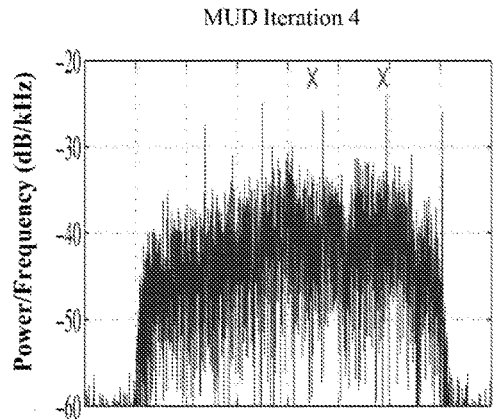
Figure 12C:
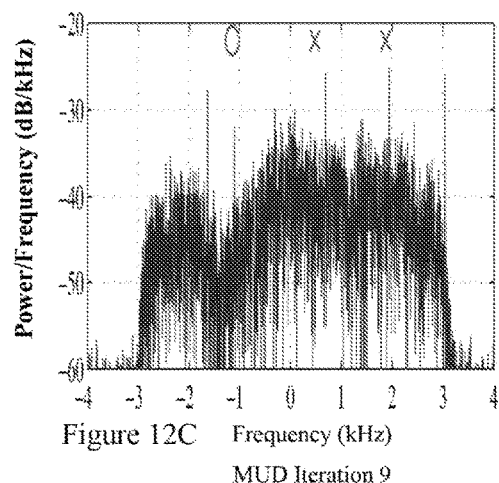
Figure 12D:
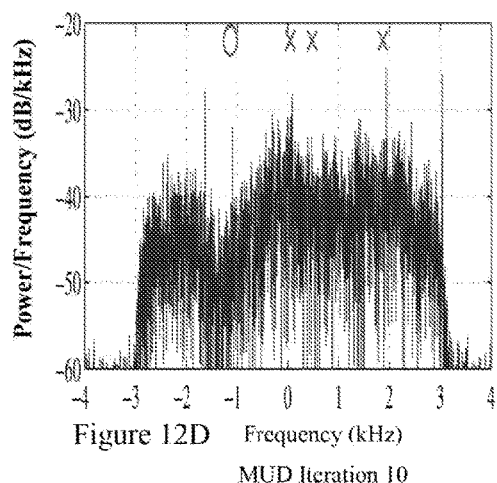
Figure 12E:
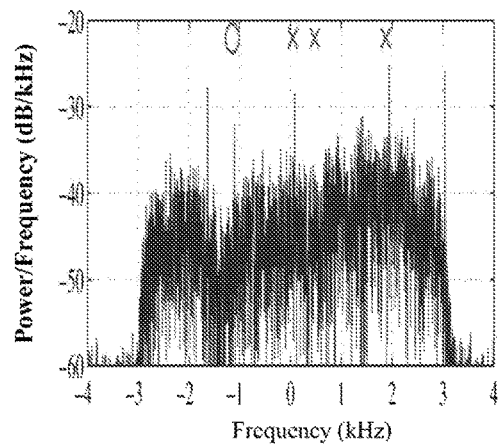
Figure 12F:
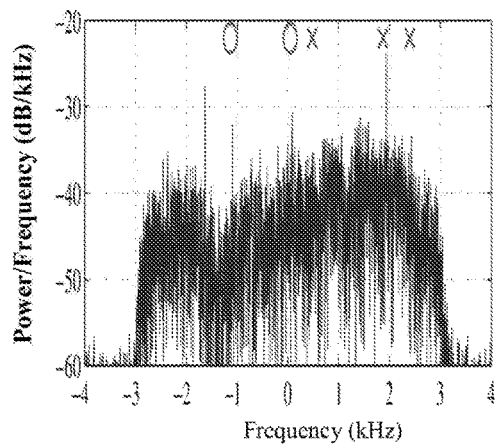

The second stage of processing may be collocated with the first and separated in time, eg allowing a satellite to complete the second processing stage in times of lighter load over regions with low terminal population. In other embodiments the distributed receiver may include multiple receive antennas and first stage processors. FIG. 11 shows a one embodiment which comprises two first stage receive processors, A and B. The distributed processing approach described here may be extended to accommodate more than two first stages. The antennas and first stage processors may be collocated or may be on separate devices.

The receiver second stage may operate on inputs coming from the multiple first stages in series or in parallel. In a one embodiment the first stages include antennas having different polarisations. The receiver second stage decodes packets from each first stage independently and then generates the set of all packets decoded as the union of the two decoder outcomes.

In another embodiment, the second stage receive processor operates iteratively, feeding outputs derived from first stage A into processing of first stage B, and vice versa. Channel parameters associated with packets received from first processing stage A are used for complexity reduction and/or improved estimation accuracy during receiver processing on first processing gage B, and vice versa. Processing may be repeated in a loop until some termination condition is met, as described above.

For a field trial, 9 terminals were implemented according to the transmitter described above with the following specifications. Slots are 250 ms long and the symbol rate is 1024 symbols per second. The data source is a sequence of 232 binary digits. The scrambler is an additive sequence of a linear feedback shift register with polynomial as in the section on the transmit scrambler. The encoder is a rate ½ irregular systematic repeat accumulate code. A fixed interleaver for each user is applied. The pilot sequence is inserted at the beginning of the transmission and consists of the sequence shown in the section on transmitted pilots. The modulator is a Gray-mapped quaternary phase shift keyed modulator. The pulse filter is a root-raised cosine fiber with roll-off $\beta=0.5$. The discrete tone has frequency 640 Hz relative to the centre of the baseband signal and is attenuated $-7$ dB with respect to the data signal.

Terminals were placed on the ground and transmitted in a hand with centre frequency of 162.725 MHz. Time offset, frequency offset and frequency rate of a satellite pass were emulated by the terminals and the signals were recorded by a payload on an aircraft cruising at 10,000 feet. The 9 terminals transmitted in a bandwidth of approximately 6 kHz.

The recorded data was fed to a compute cluster for decoding according to the multi user decoder described above where serial processing of users was used in the multiser detector. The residual signal after selected iterations is shown in FIGS. 12A to 12L. Markers at the top of the plots indicate the state of the set of acquired users, where a x corresponds to an acquired but not successfully decoded user and a ○ corresponds to as user that was acquired and decoded. The figure shows that the individual signals get cancelled during the iterations of the multiuser decoder. All users are decoded after 16 iterations.

The system addresses the problem of how to efficiently share the medium between different transmitter through use of a carefully designed transmitter waveform and a multiuser receiver which employs iterative soft interference cancellation to ameliorate the effects of multiple-access interference, while supporting relatively uncoordinated channel access by the transmitters. In particular the addition by transmitters of a predefined signed to aid acquisition, such as a discrete tone, assists the multiuser decoder in rapidly acquiring the user. Once initially acquired, the coarse estimates can be updated and then subtracted from the residual signal to allow detection of weaker signals. Rapid coarse acquisition thus enables efficient throughput.

The system described above provides the following advantages for the transmitters: Low complexity transmitter implementation; Does not require frequency synchronisation between transmitters; Does not require strong time synchronisation between transmitters; and Does not require a feedback channel from the receiver to the transmitter. That is it supports "open-loop" operation. This is an advantage for low implementation complexity, where it is not necessary for the transmitter devices to be able to also receive signals.

The multiuser receiver discussed above provides the following advantages. First, it can be implemented in a distributed manner. This allows for a low-complexity remote front end (eg on board a satellite) which forwards received samples to a more capable processing unit (eg located at a satellite ground station). Second, it is highly parallelisable. The main processing task for each transmitter's signal can be preformed in parallel. Third, it exploits special structure (ie predefined signals such as a discrete tone) introduced in the transmitted signals to obtain initial estimates of gain and time, frequency and phase offsets, even in the presence of multiple access interference. These estimates are obtained using low complexity algorithms. Fourth, the receiver computes accurate, time-varying SINR estimates for each user. Fifth, following the soft decoding for each user, the receiver refines its estimates of gain and time, frequency, frequency rate and phase offsets. This greatly improves the quality of the cancellation process and delivers better convergence properties compared to previous approaches.

Figure 13:
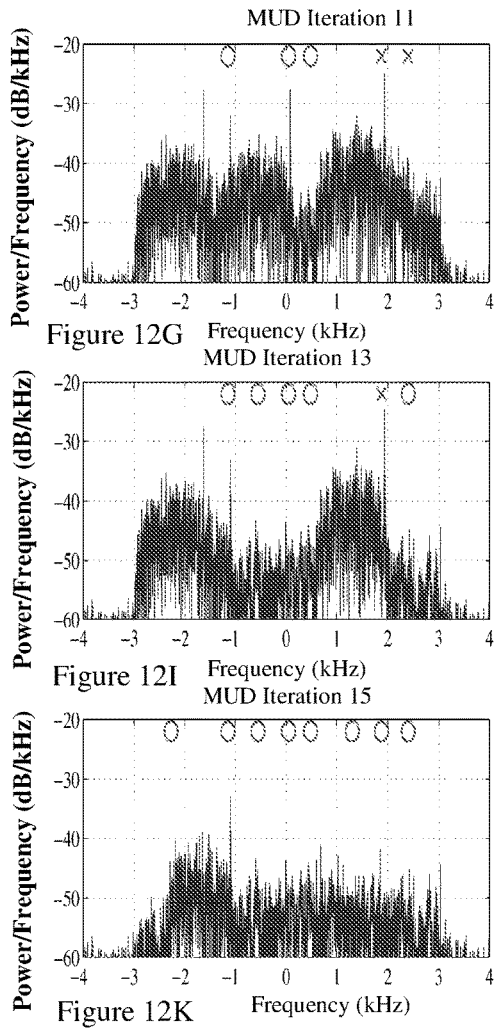
FIG. 13 is schematic diagram of a computing device according to an embodiment.
Figure 13:
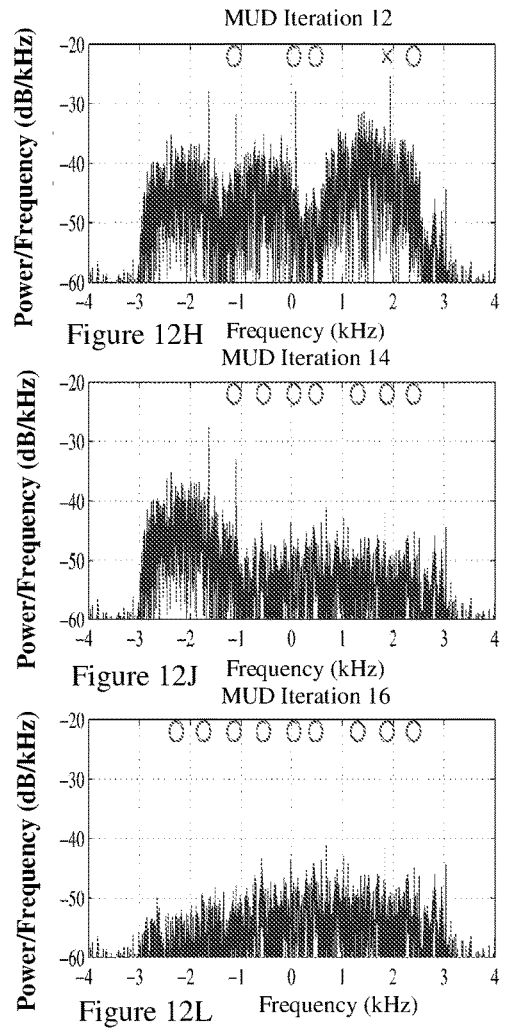
Figure 13:
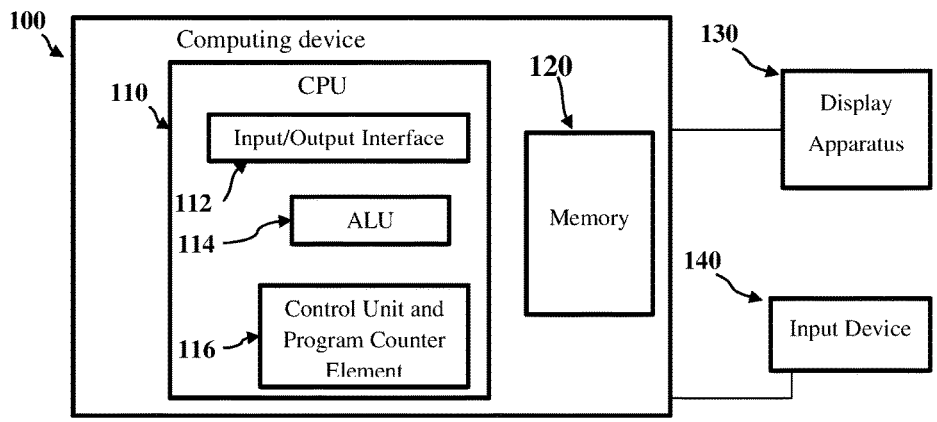

The methods described herein may be a computer implemented using one or more computing devices. The computing device may comprise a processor and a memory, and one or more input or output devices. The memory may comprise instructions to cause the processor to execute a method described herein (and the processor may be configured to execute these instruction). These instructions may be stored as computer codes, which are loaded and executed. The computing device may be a standard computing device, such as a desktop computer, server or portable computing device such as a laptop computer, or they may be included in a customised device or system, or the computing device may be specialised high performance or real time computing device. The computing device may be a unitary computing or programmable device, or a distributed device comprising several components operatively (or functionally) connected via wired or wireless connections. An embodiment of a computing device 100 is illustrated in FIG. 13 and comprises a central processing unit (CPU) 110, a memory 120, an optionally a display apparatus 130 and an input device 140 such as keyboard, mouse, etc. The CPU 110 comprises an Input/Output Interface 112, an Arithmetic and Logic Unit (ALU) 114 and a Control Unit and Program Counter element 116 which is in communication with input and output devices (eg input device 140 and display apparatus 130) through the Input/Output Interface. The Input/Output Interface may comprise a network interface and/or communications module for communicating with an equivalent communications module in another device using a predefined communications protocol (eg Bluetooth, Zigbee, IEEE 802.15, IEEE 802.11, TCP/IP, UDP, etc), A graphical processing unit (GPU) may also be included. The display apparatus may comprise a flat screen display (eg LCD, LED, plasma, touch screen, etc), a projector, CRT, etc. The computing device may comprise a single CPU (core) or multiple CPU's (multiple core). The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules that can be loaded and executed by the processor(s).

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group integers. It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements (A and B, A and C, B and C, A and B and C)." In addition, the articles "a" and "an" as used in this application and the appended claims should generally be construed to mean "one or more" unless specified otherwise or clear from context to be directed to a singular form.

The reference to any prior art in this specification is not, and should not be taken as, acknowledgement of any form of suggestion that such prior art forms part of the common general knowledge.

It will be appreciated by those skilled in the art that the invention is not restricted in its use to the particular application described. Neither is the present invention restricted in its one embodiment with regard, to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for operation of a multiuser receiver in a slot based wireless communication system to detect multiple transmissions via iterative soft interference cancellation, the method comprising:
   a) receiving a signal in a slot;
   b) attempting to acquire one or more user signals in a residual signal by searching for a predefined signal inserted in a complex transmit signal transmitted by a user to aid acquisition, and for each new user signal acquired, estimating a set of channel parameters for the acquired new user signal, and adding the acquired new user signal to a set of acquired user signals, wherein the set of channel parameters comprises at least one of a complex gain, a time offset, a frequency offset, a rate of change of frequency offset, or a noise variance;
   c) decoding the residual signal, for each acquired user signal in the set of acquired user signals comprising:

generating a soft estimate of the complex transmit signal associated with the acquired user signal; and refining or initially estimating at least one of a time offset estimate, a frequency offset estimate, a rate of change of frequency offset estimate, a complex gain estimate, an interference plus noise power estimate, or a signal to interference plus noise ratio (SINR) estimate using the soft estimate of the complex transmit signal, a previous soft estimate of the signal contribution from the user, and the residual signal to obtain an updated set of channel parameters for the acquired user signal and an updated soft estimate of the signal contribution in the residual signal from the acquired user signal;

d) updating the residual signal by subtracting the updated soft estimate of the signal contribution for each user signal obtained in step c) from the residual signal; and e) performing another iteration of steps b) to d) until a termination condition is met wherein the updated residual signal in previous step d) is the residual signal in the next iteration of steps b) to d), and wherein steps c) and d) may be performed serially, or step c) may be performed in parallel for each user signal in the set of acquired user signals, such that the residual signal for the next iteration of steps b) to d) comprises the residual signal from which the updated soft estimate of the signal contribution for each user signal has been subtracted, and during each iteration, step c) may be repeated for a user signal in the set of acquired users or step c) may be skipped for one or more user signals in the set of acquired user signals in which case the previous soft estimate of the signal contribution from the acquired user signal is used as the updated soft estimate of the signal contribution from the acquired user signal, wherein the residual signal in step b) is the received signal from step a) if step d) has not yet been performed.

2. The method as claimed in claim 1, wherein in step b) searching for the predefined signal comprises using a coarse frequency estimator to obtain a coarse frequency estimate, and estimating the set of channel parameters for the acquired new user signal comprises performing fine frequency estimation to obtain an estimate of the frequency offset for the new user signal by adding the coarse frequency estimate and the fine frequency estimate.

3. The method as claimed in claim 2, wherein the predefined signal to aid acquisition is a discrete tone, and the coarse frequency estimator maximises a periodogram over a frequency range wherein the frequency range is restricted to allow for acquisition in specific frequency intervals or avoid acquisition in specific frequency intervals, and the coarse frequency offset is obtained from the frequency corresponding to the maximum absolute value of the periodogram by subtracting the frequency of the discrete tone.

4. The method as claimed in claim 1, wherein in step b) estimation of the set of channel parameters for the acquired new user signal takes into account that channel parameter values are correlated as a result of propagation mechanisms of a channel.

5. The method as claimed in claim 1, wherein prior to performing step a), a packet transmitted by a first user is received and decoded, and in step b) attempting to acquire one or more user signals comprises using information obtained from the previously received and decoded packet transmitted by the first user to acquire the first user as a new user signal in the residual signal.

6. The method as claimed in claim 1, wherein prior to performing step a), a packet transmitted by a first user is received and decoded, and in step b) attempting to acquire one or more user signals comprises using a knowledge of the system dynamics for the first user determined using the previously received and decoded packet transmitted by a first user to acquire the first user as a new user signal in the residual signal.

7. The method as claimed in claim 1, wherein in step b) attempting to acquire the one or more user signals in the residual signal comprises:

receiving an oversampled residual signal;

performing an initial compensation for a Doppler rate in the received oversampled residual signal;

estimating an initial coarse frequency offset using the predefined signal and removing an estimated coarse frequency offset from the oversampled residual signal;

estimating a time offset with respect to a nominal slot boundary;

filtering the oversampled residual signal using a pulse matched filter using the estimated time offset to generate a symbol rate signal;

estimating a complex signal gain, a fine frequency offset and frequency rate of change, wherein a final estimate of the frequency offset is obtained as the sum of the initial coarse frequency offset and the fine frequency estimate; and removing or cancelling the predefined signal.

8. The method as claimed in claim 1, wherein for each new user signal acquired in step b), a new instance of a single user decoder module is spawned, and in step c) decoding of the residual signal for the acquired user signal is performed by the instantiated single user decoder module for the acquired user signal and the single user decoder module generates an updated soft estimate and the channel parameters of a current user signal and a hard decision of the data and comprises the following steps:

receiving an oversampled residual signal;

adding a previous soft estimate of the signal contribution from the current user signal to the oversampled residual signal;

removing an estimated effect of a communications channel on the current user signal by applying a previous estimate of the channel parameters for the current user signal to the received oversampled residual signal;

filtering the oversampled residual signal using a pulse matched filter to generate a symbol rate signal;

cancelling or removing the predefined signal;

estimating at least one of a signal amplitude, noise plus interference power, and signal to interference plus noise ratio (SINR);

soft decoding the symbol rate signal to generate a decoder quality metric, a data hard decision and a data soft decision;

soft remodulating data soft decisions and generating a soft symbol estimate for the user signal, and soft estimates of complex transmit signal;

adding the predefined signal to the complex transmit signal;

refining at least one of a time offset estimate, a frequency offset estimate, a rate of change of frequency offset estimate, a complex gain estimate, an interference plus noise power estimate, and a signal to interference plus noise ratio (SINR) estimate using the soft estimates of the complex transmit signal, the previous soft estimate of the signal contribution from the user signal, and the residual signal to obtain an updated set of channel parameters for the acquired user signal; and applying the set of updated channel parameters to the soft estimate of the complex transmit signal to generate an updated soft estimate of the signal contribution from the user signal.

9. The method as claimed in claim 8, wherein the SINR is estimated by estimating a signal power from a most recent soft symbol estimate and an interference-plus-noise power is estimated from a symbol rate signal at the output of the pulse matched filter.

10. The method as claimed in claim 8, wherein the refining step comprises defining a search grid over one or more of the channel parameters and obtaining a frequency estimate at each grid point, and a best result over all grid points is used as a starting point for a numerical optimisation method to obtain an optimised channel parameter estimates for estimating the complex gain of the channel.

11. The method as claimed in claim 8, wherein the single user decoder module also generates a decoder quality metric, and in step c), if the decoder quality metric obtained in a previous iteration exceeds a predetermined threshold, then processing of the oversampled residual signal is skipped and the previous soft estimate of the signal contribution is output as the updated soft estimate of the signal contribution.

12. The method as claimed in claim 1, wherein decoding the residual signal, for each user signal in the set of acquired user signals, also generates a decoder quality metric for each user signal, and step b) further includes deciding whether to acquire a new user signal based on the decoder quality metrics of all previously acquired user signals.

13. The method as claimed in claim 1, wherein in step e) the termination condition is met if a confidence interval for an estimated channel parameter obtained in step b) exceeds a threshold range.

14. The method as claimed in claim 1, wherein the multiuser receiver is implemented as a distributed receiver, wherein processing is segmented into two stages, where the outputs of the first stage feed a second stage via a network.

15. The method as claimed in claim 14, wherein the distributed receiver comprises multiple receive antennas and first stage processors, and the receiver second stage operates for one or more iterations on inputs coming from multiple first stages in series or in parallel.

16. The method as claimed in claim 1, wherein the multiuser receiver is located on a satellite and the multiple transmission are over a satellite channel with significant frequency shifts, frequency rate of change or time delays compared to a terrestrial channel.

17. A multiuser decoder for use in a multiuser receiver in a slot based wireless communication system, the multiuser decoder configured to decode multiple transmissions in a residual signal received in a slot using iterative soft interference cancellation, the multiuser decoder comprising:

an initial acquisition module configured to acquire one or more user signals in a residual signal by searching for a predefined signal inserted in a complex transmit signal transmitted by a user to aid acquisition, and to estimate a set of channel parameters for each acquired user signal, wherein the set of channel parameters comprises at least one of a complex gain, a time offset, a frequency offset, a rate of change of frequency offset, or a noise variance; and one or more single user decoder modules wherein each single user decoder is configured to generate a soft estimate of the signal contribution from an acquired user signal in the residual signal and to update the set of channel parameters for the acquired user signal, and comprising:

a signal to interference plus noise ratio (SINR) estimator to estimate at least one of a signal amplitude, noise plus interference power, and SINR;

a soft decoder;

a soft remodulator configured to generate soft estimates of a complex transmit signal associated with the acquired user signal;

a channel parameter updater block configured to refine or initially estimate at least one of a time offset estimate, a frequency offset estimate, a rate of change of frequency offset estimate, and a complex gain estimate, an interference plus noise power estimate, or a signal to interference plus noise ratio (SINR) estimate using the soft estimates of the complex transmit signal, a previous soft estimate of the signal contribution from the user, and the residual signal to obtain the updated set of channel parameters;

a channel application module configured to apply the updated channel parameters to the soft estimates of the complex transmit signal to generate a soft estimate of the signal contribution in the residual signal from the acquired user signal; and wherein the multiuser decoder is configured to iteratively generate an updated residual signal until a termination condition is met wherein each iteration comprises acquiring the one or more user signals in the residual signal using the initial acquisition module, and for each acquired user signal, spawning an instance of a single user decoder module, and then for each acquired user signal, the respective single user decoder generates the soft estimate of the signal contribution from the acquired user signal, and then generating the updated residual signal by subtracting the soft estimate of the signal contribution for each acquired user signal obtained from each single user decoder from the residual signal, and in the first iteration the residual signal provided to the initial acquisition module is a received signal and in subsequent iterations the residual signal provided to the initial acquisition module is the updated residual signal, wherein the one or more single user decoder modules may be configured serially or in parallel, and during each iteration, a single user decoder module for a user in the set of acquired users may be repeatedly activated or may be skipped in which case the previous soft estimate of the signal contribution from the acquired user signal is used as the updated soft estimate of the signal contribution from the acquired user signal.

18. An initial acquisition module for use in a multiuser decoder configured to acquire one or more user signals in a residual signal, the initial acquisition module comprising:

an input for receiving an oversampled residual signal;

a compensator performing an initial compensation for a Doppler rate in the received oversampled residual signal;

a coarse frequency offset estimator for estimating an initial coarse frequency offset by searching for a predefined signal inserted in a complex transmitted signal transmitted by a user to aid acquisition and the coarse frequency offset estimator is configured to remove the estimated initial coarse frequency offset from the residual signal;

a time offset estimator for estimating a time offset with respect to a nominal slot boundary;

a pulse matched filter for filtering the oversampled residual signal using the estimated time offset from the time offset estimator to generate a symbol rate signal;

an estimator module for estimating a complex signal gain, a fine frequency offset and frequency rate of change from the symbol rate signal, wherein a final estimate of the frequency offset is obtained as a sum of the initial coarse frequency offset and a fine frequency estimate; and an acquisition signal removal module for either removing or cancelling the predefined signal inserted into the transmitted signal by the user to aid acquisition.

19. A single user decoder module configured to provide updated versions of a soft estimate of the signal contribution from a user signal in a signal and to provide updated channel parameters for the user signal and hard decisions of data, the single user decoder comprising:

an input for receiving an oversampled residual signal;

an adder for adding a previous soft estimate of the signal contribution from the user signal;

a channel removal module for removing an estimated effect of a communications channel on the user signal by using a previous estimate of the channel parameters;

a pulse matched filter for filtering the oversampled residual signal to generate a symbol rate signal;

an acquisition signal removal module for either removing or cancelling a predefined signal inserted into a transmitted signal by a user to aid acquisition from the oversampled residual signal;

a signal to interference plus noise ratio (SINR) estimator to estimate at least one of a signal amplitude, noise plus interference power, and SINR;

a decoder for soft decoding the oversampled residual signal to generate a decoder quality metric, a data hard decision and a data soft decision;

a soft remodulator for soft remodulating the data soft decision and generating a soft symbol estimate for the user signal, and soft estimates of a complex transmit signal associated with the received oversampled residual signal;

an acquisition signal adder module for adding the predefined signal to aid acquisition to the complex transmit signal;

a channel parameter updater block configured to refine at least one of a time offset estimate, a frequency offset estimate, a rate of change of frequency offset estimate, and a complex gain estimate, an interference plus noise power estimate, and a signal to interference plus noise ratio (SINR) estimate using the soft estimates of the complex transmit signal, a previous soft estimate of the signal contribution from the user, and the residual signal to obtain updated channel parameters; and a channel application module configured to apply the updated channel parameters to the soft estimates of the complex transmit signal to generate a soft estimate of the signal contribution from the user signal.

* * * * *